United States Patent
Wei et al.

(10) Patent No.: US 12,225,529 B2
(45) Date of Patent: Feb. 11, 2025

(54) INFORMATION SCHEDULING METHOD, APPARATUS AND DEVICE, AND STORAGE MEDIUM

(71) Applicant: ZTE CORPORATION, Shenzhen (CN)

(72) Inventors: Xingguang Wei, Shenzhen (CN); Peng Hao, Shenzhen (CN); Jing Shi, Shenzhen (CN); Chenchen Zhang, Shenzhen (CN); Shuqiang Xia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 293 days.

(21) Appl. No.: 17/793,891

(22) PCT Filed: Jan. 11, 2021

(86) PCT No.: PCT/CN2021/071041
§ 371 (c)(1),
(2) Date: Jul. 19, 2022

(87) PCT Pub. No.: WO2021/147695
PCT Pub. Date: Jul. 29, 2021

(65) Prior Publication Data
US 2023/0062788 A1    Mar. 2, 2023

(30) Foreign Application Priority Data
Jan. 20, 2020   (CN) .......................... 202010067578.4

(51) Int. Cl.
*H04W 72/1273*   (2023.01)
*H04W 72/23*   (2023.01)

(52) U.S. Cl.
CPC ....... *H04W 72/1273* (2013.01); *H04W 72/23* (2023.01)

(58) Field of Classification Search
CPC ............. H04W 72/1273; H04W 72/23; H04W 72/0446; H04W 72/232; H04L 5/001; H04L 5/0032
See application file for complete search history.

(56) References Cited

U.S. PATENT DOCUMENTS

| | | | |
|---|---|---|---|
| 2011/0044239 A1* | 2/2011 | Cai | H04L 5/0098 370/328 |
| 2017/0338918 A1* | 11/2017 | Tang | H04L 5/001 |

(Continued)

FOREIGN PATENT DOCUMENTS

| CN | 104901775 A | 9/2015 |
|---|---|---|
| CN | 105578608 A | 5/2016 |
| CN | 110536444 A | 12/2019 |
| CN | 110719643 A | 1/2020 |
| CN | 111901885 A | 11/2020 |

(Continued)

OTHER PUBLICATIONS

Indonesian office action issued in ID Patent Application No. P00202208337, dated Jul. 8, 2024, 6 pages. English translation included.

(Continued)

*Primary Examiner* — Hanh N Nguyen
(74) *Attorney, Agent, or Firm* — Perkins Coie LLP

(57) ABSTRACT

Provided are an information scheduling method and apparatus, a device and a storage medium. The method includes: receiving PDSCH configuration information from a second communication node, receiving DCI from the second communication node, and determining scheduling information of a PDSCH on at least one carrier according to the PDSCH configuration information and the DCI.

14 Claims, 3 Drawing Sheets

(56) References Cited

U.S. PATENT DOCUMENTS

| | | | |
|---|---|---|---|
| 2017/0374653 | A1 | 12/2017 | Lee et al. |
| 2019/0149365 | A1 | 5/2019 | Chatterjee et al. |
| 2019/0159213 | A1 | 5/2019 | Baldemair et al. |
| 2020/0053755 | A1* | 2/2020 | Ang .................. H04W 72/0446 |
| 2020/0107299 | A1* | 4/2020 | Zhou .................. H04W 56/005 |
| 2022/0191880 | A1 | 6/2022 | Wei et al. |
| 2022/0338226 | A1* | 10/2022 | Nemeth .................. H04L 5/001 |
| 2024/0179716 | A1* | 5/2024 | Liang .................... H04L 1/1812 |

FOREIGN PATENT DOCUMENTS

| | | |
|---|---|---|
| EP | 3247061 A1 | 11/2017 |
| EP | 3557804 A1 | 10/2019 |

OTHER PUBLICATIONS

Qualcomm Incorporated, "Remaining Issues on BWP," 3GPP TSG RAN WG1 Meeting #92, R1-1802844, Athens, Greece, Feb. 26-Mar. 2, 2018, 24 pages.

European Search Report issued in EP Patent Application No. 21743785.4, dated Jan. 25, 2024, 10 pages.

International Preliminary Report on Patentability issued in International Patent Application No. PCT/CN2021/071041, dated Jul. 26, 2022, 5 pages.

Written Opinion issued in International Patent Application No. PCT/CN2021/071041, dated Apr. 9, 2021, 9 pages. English translation included.

International Search Report for Application No. PCT/CN2021/071041, dated Apr. 9, 2021, 4 pages including English translation.

Mediatek Inc., "Enhancements to HARQ and scheduling for NR-U operation", 3GPP TSG RAN WG1 #99 R1-1912090, Nov. 22, 2019 (Nov. 22, 2019), entire document, 9 pages.

Chinese office action issued in CN Patent Application No. 202010067578.4, dated Jul. 29, 2024, 17 pages. English translation included.

Qualcomm Incorporated, "PDCCH Enhancements for eURLLC," 3GPP TSG-RAN WG1 Meeting #98, R1-1909264, Aug. 26-30, 2019, Prague, Czech Republic, 14 pages.

* cited by examiner

INFORMATION SCHEDULING METHOD, APPARATUS AND DEVICE, AND STORAGE MEDIUM

CROSS-REFERENCES TO RELATED APPLICATIONS

This is a National Stage Application, filed under 35 U.S.C. 371, of International Patent Application No. PCT/CN2021/071041, filed on Jan. 11, 2021, which is based on and claims priority to Chinese Patent Application No. 202010067578.4 filed with the China National Intellectual Property Administration (CNIPA) on Jan. 20, 2020, the disclosure of which is incorporated herein by reference in its entirety

TECHNICAL FIELD

The present application relates to the field of communications and, in particular, to an information scheduling method and apparatus, a device, and a storage medium.

BACKGROUND

In the existing 5G communication system, one piece of downlink control information (DCI) only schedules a physical downlink shared channel (PDSCH) on one carrier at a time. If the PDSCH is scheduled on a plurality of carriers, the base station needs to issue a plurality of pieces of DCI, which results in a high load of control signaling transmitted by the 5G system.

SUMMARY

Embodiments of the present application provide an information scheduling method and apparatus, a device and a storage medium, so as to reduce load of control signaling transmitted by the 5G communication system.

Embodiments of the present application provide an information scheduling method. The information scheduling method is applied to a first communication node and includes the following.

PDSCH configuration information is received from a second communication node is received.

DCI is received from the second communication node is received.

Scheduling information of a PDSCH on at least one carrier is determined according to the PDSCH configuration information and the DCI.

Embodiments of the present application provide an information scheduling method.

The information scheduling method is applied to a second communication node and includes the following.

Predetermined PDSCH configuration information is sent to a first communication node.

DCI used for scheduling a PDSCH on at least one carrier is determined according to the PDSCH configuration information.

The DCI is sent to the first communication node.

Embodiments of the present application provide an information scheduling apparatus. The information scheduling apparatus is applied to a first communication node and includes a first receiving module, a second receiving module and a first determination module.

The first receiving module is configured to receive PDSCH configuration information from a second communication node.

The second receiving module is configured to receive DCI from the second communication node.

The first determination module is configured to determine scheduling information of a PDSCH on at least one carrier according to the PDSCH configuration information and the DCI.

Embodiments of the present application provide an information scheduling apparatus. The information scheduling apparatus is applied to a second communication node and includes a first sending module, a second determination module and a second sending module.

The first sending module is configured to send predetermined PDSCH configuration information to a first communication node.

The second determination module is configured to determine DCI used for scheduling a PDSCH on at least one carrier according to the PDSCH configuration information.

The second sending module is configured to send the DCI to the first communication node.

Embodiments of the present application provide a device. The device includes a memory and one or more processors.

The memory is configured to store one or more programs.

The one or more programs, when executed by the one or more processors, cause the one or more processors to implement the method of any one of the preceding embodiments.

Embodiments of the present application provide a storage medium. The storage medium is configured to store a computer program which, when executed by a processor, implements the method of any one of the preceding embodiments.

DETAILED DESCRIPTION

Figure 1:
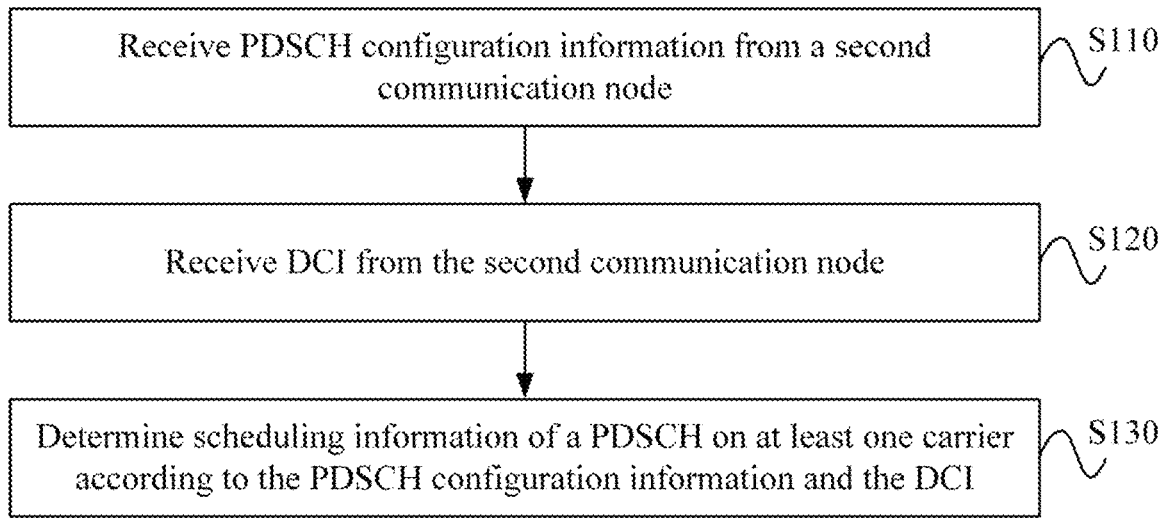
FIG. 1 is a flowchart of an information scheduling method according to an embodiment of the present application.

Embodiments of the present application are described below in conjunction with drawings.

According to the 3rd Generation Partnership Project (3GPP) 5G protocol, a DCI format 1_0 and a DCI format 1_1 are used for scheduling a PDSCH on one carrier. Furthermore, a DCI format 1_2 introduced by 3GPP in Release 16 (R16) protocol can only be used for scheduling the PDSCH on one carrier. In order to schedule the PDSCH on a plurality of carriers, the base station needs to send a plurality of pieces of DCI, which results in a high load of control signaling transmitted by the 5G system. Reducing the resource load of the control signaling, especially the resource load occupied by the DCI, can improve the utilization efficiency of 5G system resources. Furthermore, after the resource load occupied by the DCI is reduced, a user equipment (UE) distributes less energy for detecting the DCI, thereby contributing to the energy saving of the UE.

In the existing 5G systems and standards, a radio resource control (RRC) configures carriers for self-scheduling or cross-carrier scheduling. The self-scheduling is receiving the DCI on the current carrier and scheduling the PDSCH on the current carrier, and the cross-carrier scheduling is receiving the DCI on one carrier and scheduling the PDSCH on another carrier. In a case where the RRC configures one carrier (denoted as carrier C) for the cross-carrier scheduling, the RRC configures a scheduling carrier (i.e. which carrier schedules the carrier C) of the carrier C and configures a carrier indicator field (CIF) index corresponding to the carrier C. The CIF field in the DCI indicates the CIF index, for example, in the case where the CIF field in the DCI on the scheduling carrier indicates the CIF index of the carrier C, the DCI schedules the PDSCH on the carrier C. The cross-carrier scheduling is configured by an RRC cross-carrier scheduling configuration (CrossCarrierScheduling-Config) information element, the scheduling cell identifier (schedulingCellId) information element in the CrossCarrierSchedulingConfig information element configures a carrier index of the scheduling carrier, and the cell scheduling CIF index (cif-InSchedulingCell) information element in the CrossCarrierSchedulingConfig information element configures a CIF index corresponding to the carrier. Assuming that the RRC configures that the carrier C is scheduled across carriers by a carrier A and configures the CIF index corresponding to carrier C to be 1, and in the case where the CIF field in the DCI on the carrier A indicates that the CIF index is 1, the DCI schedules the PDSCH on the carrier C. It is to be noted that the CIF field cannot be configured in the DCI format 1_0, that is, the DCI format 1_0 can only be used for self-scheduling but not for cross-carrier scheduling, and the CIF field can be configured in the DCI format 1_1 and the DCI format 1_2, i.e. can be used for the cross-carrier scheduling.

In a case where the RRC configures the carrier for self-scheduling, the DCI format 1_0, the DCI format 1_1 and the DCI format 1_2 are used for scheduling a PDSCH on the carrier. In a case where the RRC configures the carrier for cross-carrier scheduling, the CIF field of the DCI (the DCI format 1_1 and the DCI format 1_2) on the scheduling carrier can only indicate one CIF index per scheduling, and one CIF index can only correspond to one carrier. In the case where the RRC configures the carrier for cross-carrier scheduling, the DCI format 1_1 and the DCI format 1_2 can only schedule PDSCH on one carrier at a time. If a base station schedules the PDSCH on a plurality of carriers, the base station needs to send a plurality of pieces of DCI, which results in a high load of the 5G system transmitting the control signaling.

In the existing 5G systems and standards, the base station needs to indicate a slot offset $K_0$, a start length indicator value (SLIV) and a PDSCH mapping type for determining a slot and symbol where the scheduled PDSCH is located. The RRC configures time domain resource allocation information elements of one or more PDSCH in a time domain resource allocation list information element of the PDSCHs. The time domain resource allocation information element of the PDSCH is indicated by PDSCH-TimeDomainResourceAllocation. The time domain resource allocation information element of each PDSCH includes an information element k0, a mapping type (mappingType) and a start length indicator value, where k0 indicates $K_0$ of the each PDSCH, the mappingType indicates a mapping type of the each PDSCH, and the start length indicator value indicates an SLIV of the each PDSCH. The time domain resource assignment (TDRA) field in the DCI indicates the a TDRA index, TDRA index 0 corresponds to a first PDSCH-TimeDomainResourceAllocation in the PDSCH-TimeDomainResourceAllocationList information element, TDRA index 1 corresponds to a second PDSCH-TimeDomainResourceAllocation in the PDSCH-TimeDomainResourceAllocationList information element, and so on. Therefore, according to the TDRA index indicated by the TDRA field in the DCI, the UE can determine $K_0$, the SLIV and the PDSCH mapping type of the scheduled PDSCH so as to determine the slot and symbol where the PDSCH is located.

Since the DCI can only indicate one $K_0$, one SLIV and one PDSCH mapping type through the TDRA field at a time, one DCI can only schedule the PDSCH on one carrier at a time. If a base station schedules the PDSCH on a plurality of carriers, the base station needs to send a plurality of pieces of DCI, which results in a high load of the control signaling transmitted by the 5G system.

Therefore, in the existing 5G systems and standards, there are many limitations in the mechanism of the DCI scheduling the PDSCH, so that the DCI can only schedule the PDSCH on one carrier at a time. In order to reduce the load of control signaling transmitted by a system, especially the load of DCI transmitted by the system, how to schedule PDSCH is an urgent problem to be solved at present.

In an embodiment, FIG. 1 is a flowchart of an information scheduling method according to an embodiment of the present application. This embodiment is applied to a first communication node. For example, the first communication node may be a UE. As shown in FIG. 1, this embodiment includes S110 to S130.

In S110, PDSCH configuration information is received from a second communication node is received.

In this embodiment, the second communication node may be a base station and a network side (for example, the network side may be a core network). In this embodiment, the PDSCH configuration information is used for configuring scheduling information of a PDSCH of the DCI on at least one carrier for the second communication node and the first communication node.

In S120, the DCI is received from the second communication node is received.

In this embodiment, the DCI includes various fields, such as a carrier indication field (CIF), a time domain resource assignment (TDRA) field, etc. In this embodiment, the PDSCH configuration information is to configure a specific parameter to the information indicated in the CIF field and/or the TDRA field in the DCI.

In S130, scheduling information of a PDSCH on at least one carrier is determined according to the PDSCH configuration information and the DCI.

In this embodiment, after the first communication node receives the PDSCH configuration information and the DCI, scheduling information of the PDSCH on each carrier may be determined according to the PDSCH configuration information and information indicated by different fields in the DCI.

In an embodiment, the scheduling information includes at least one of: a number of carriers currently scheduled, time domain resource indication information, a carrier scheduling PDSCH currently, or a CIF index scheduling PDSCH currently.

In this embodiment, the number of carriers currently scheduled refers to the number of carriers currently scheduled by DCI, for example, the number of carriers currently scheduled may be one or more. The time domain resource indication information refers to relevant information of the time domain resource occupied by the PDSCH currently scheduled by the DCI. The carrier scheduling the PDSCH currently refers to a carrier index where the DCI currently schedules the PDSCH, for example, the RRC signaling configures five carriers, the carrier indexes are respectively carrier 1, carrier 2, carrier 3, carrier 4 and carrier 5, and the carriers scheduling the PDSCH currently are carrier 2 and carrier 3, then the carriers scheduling the PDSCH currently refer to carrier 2 and carrier 3. The CIF index scheduling the PDSCH currently refers to the CIF index corresponding to the carrier where the DCI currently schedules the of, that is, there is a mapping relationship between the CIF index and the carrier where the current PDSCH is located.

In an embodiment, the PDSCH configuration information includes a total number M of carriers schedulable to the DCI, and a radio network temporary identifier (RNTI) used for indicating the DCI to currently schedule a PDCSH on one or N carriers, where N is a positive integer greater than 1 and less than or equal to M.

In this embodiment, the total number of carriers schedulable to the DCI refers to the total number of carriers being able to be scheduled by the DCI configured by RRC signaling. The DCI currently schedules one or N carriers, which belong to a subset of the total carriers schedulable to the DCI, that is, N is less than or equal to the total number of carriers schedulable to the DCI. Exemplarily, assuming that the total number of carriers schedulable to the DCI is 5, i.e. M=5, one or N carriers currently scheduled by the DCI indicated by the RNTI are at least one of the total five schedulable carriers, and N is less than or equal to 5.

In an embodiment, the PDSCH configuration information includes: a mapping relationship between a carrier indication field (CIF) index and a carrier, and each CIF index is mapped to at least one carrier.

In this embodiment, the CIF index may establish a mapping relationship with one or more carriers, that is, the mapping relationship is established between the CIF index and each carrier currently scheduled by the DCI. After the first communication node receives the PDSCH configuration information from the second communication node, the PDSCH on which carrier currently scheduled by the DCI can be determined. In this embodiment, the second communication node configures the mapping relationship between the CIF index and the carrier, and notifies the first communication node of the mapping relationship between the CIF index and the carrier through the RRC signaling.

In an embodiment, a CIF in the DCI indicates the CIF index, and a carrier mapped by the CIF index is a carrier on which the DCI currently schedules the PDCSH; in a case where the CIF index indicated by the CIF is mapped to N carriers, the DCI is used for scheduling PDSCHs on the N carriers, and one of the PDSCHs is scheduled on each of the N carriers, where N is a positive integer greater than 1; and in a case where the CIF index indicated by the CIF is mapped to one carrier, the DCI is used for scheduling a PDSCH on the one carrier.

In this embodiment, in a case where a mapping relationship is established between the CIF index and at least two carriers, the first communication node determines the CIF index in the CIF through the PDSCH configuration information, that is, the carrier index currently scheduled by the DCI can be determined. In an embodiment, in a case where only one PDSCH can be scheduled on each carrier, and the CIF index corresponds to a plurality of carrier indexes, the DCI can directly schedule PDSCH on a plurality of carriers, and one PDSCH is scheduled on each carrier, so that the PDSCH on one or the plurality of carriers can be scheduled through the PDSCH configuration information, and the load for transmitting the control signaling is reduced.

In an embodiment, the PDSCH configuration information includes a mapping relationship between a TDRA index and at least one group of time domain resource indication information, and each of the at least one group of time domain resource indication information includes a slot offset $K_0$, a start length indicator value (SLIV) and a PDSCH mapping type.

In an embodiment, each group of time domain resource indication information includes the same $K_0$.

In an embodiment, each group of time domain resource indication information includes the same SLIV.

In an embodiment, the PDSCH configuration information further includes a mapping relationship between the each of the at least one group of time domain resource indication information and a carrier.

In an embodiment, a TDRA field in the DCI indicates the TDRA index; in a case where the TDRA index is mapped to N groups of time domain resource indication information, the DCI is used for scheduling PDSCHs on carriers corresponding to the N groups of time domain resource indication information, and one of the PDSCHs is scheduled on each of the carriers, where N is a positive integer greater than 1; and in a case where the TDRA index is mapped to one group of time domain resource indication information, the DCI is used for scheduling a PDSCH on a carrier corresponding to the one group of time domain resource indication information.

In an embodiment, the second communication node notifies the first communication node of the mapping relationship between the TDRA index and at least one group of time domain resource indication information, and notifies the first communication node of a mapping relationship between each group of time domain resource indication information and the carrier. In a case where the TDRA index indicated by the TDRA field in the DCI is configured by the PDSCH configuration information, the carrier index currently scheduled by the DCI can be determined according to the mapping relationship between the TDRA index and the time domain resource indication information and the mapping relationship between each group of time domain resource indication information and the carrier. in a case where the DCI schedules the PDSCH on carriers corresponding to at least two groups of time domain resource indication information, the DCI schedules one PDSCH on each carrier; in a case where the TDRA index is mapped to a group of time domain resource indication information, the DCI schedules the PDSCH on the carrier corresponding to the group of time domain resource indication information.

In an embodiment, a TDRA field of the DCI and a CIF in the DCI jointly indicate the TDRA index. In this embodiment, the TDRA index may be indicated through the bits occupied by the CIF and a decimal value corresponding to the bits and bits occupied by the TDRA field and a decimal value corresponding to the bits.

In an embodiment, a CIF in the DCI indicates a CIF index, the CIF index is mapped to at least one carrier, and a TDRA field of the DCI indicates the TDRA index; in a case where the CIF index indicated by the CIF in the DCI is mapped to N carriers, and the TDRA index indicated by the TDRA field of the DCI is mapped to N groups of time domain resource indication information, the DCI is used for scheduling PDSCHs on the N carriers, and one of the PDSCHs is scheduled on each of the N carriers, where N is a positive integer greater than 1; and in a case where the CIF index indicated by the CIF in the DCI is mapped to one carrier, and the TDRA index indicated by the TDRA field of the DCI is mapped to one group of time domain resource indication information, the DCI is used for scheduling a PDSCH on the one carriers.

In this embodiment, the second communication node notifies the first communication node of the mapping relationship between the TDRA index and at least one group of time domain resource indication information, and the CIF index indicated by the CIF in the DCI is mapped to at least one carrier. In a case where the CIF index indicated by the CIF in the DCI is mapped to at least two carriers, and the TDRA index indicated by the TDRA field of the DCI is mapped to at least two groups of time domain resource indication information, the DCI schedules the PDSCHs on the at least two carriers, and one of the PDSCHs is scheduled on each of the at least two carriers. In an embodiment, in a case where the CIF index indicated by the CIF in the DCI is mapped to one carrier, and the TDRA index indicated by the TDRA field of the DCI is mapped to one group of time domain resource indication information, the DCI schedules a PDSCH on the one carrier.

In an embodiment, a number of groups of time domain resource indication information mapped by the TDRA index indicated by the TDRA field in the DCI is same as a number of carriers mapped by the CIF index indicated by the CIF in the DCI. In this embodiment, in a case where the TDRA index is mapped to N groups of time domain resource indication information, the number of carriers mapped by the CIF index is also N. N is a positive integer greater than 1.

In an embodiment, a CIF in the DCI is used for indicating a CIF index, and the CIF index is mapped to a carrier of which one CIF index is i; and in a case where a TDRA index indicated by a TDRA field in the DCI is mapped to N groups of time domain resource indication information, the DCI is used for scheduling PDSCHs on N carriers of which CIF indexes are respectively imodM, (i+1)modM, . . . , (i+N−1)modM, and one of the PDSCHs is scheduled on each of the N carriers, where M is a total number of carriers schedulable to the DCI, N is a positive integer greater than 1, and mod is a remainder operation.

In an embodiment, the DCI indicates two CIFs, each of the two CIFs indicates one CIF index, and each CIF index is mapped to one carrier. In this embodiment, the RRC configures a plurality of carriers for the first communication node and establishes a mapping relationship between each carrier and the CIF index, that is, one CIF index is mapped to one carrier. In a case where DCI indicates two CIF domains, the carrier in which the current scheduling PDSCH is located can be determined according to the CIF index indicated by each CIF and the mapping relationship between the CIF index and the carrier.

In an embodiment, the PDSCH configuration information includes: a mapping relationship between a CIF index and two groups of carriers, where a first group of carriers includes one carrier, and a second group of carriers includes at least one carrier.

In an embodiment, in a case where the CIF index corresponds to the first group of carriers, the DCI is used for scheduling a PDSCH on the one carrier mapped by the CIF index in the first group of carriers; and in a case where the CIF index corresponds to the second group of carriers, the DCI is used for scheduling a PDSCH on the at least one carrier mapped by the CIF index in the second group of carriers, and one PDSCH is scheduled on each of the at least one carrier.

In this embodiment, the second communication node notifies the first communication node of the mapping relationship between the CIF index and the two groups of carriers. The second communication node notifies the first communication node whether the CIF index in the current DCI corresponds to the first group of carriers or the second group of carriers. In an embodiment, in a case where the CIF index in the DCI corresponds to the first group of carriers, the CIF index in the CIF is mapped to one carrier in the first group of carriers, and the DCI schedules the PDSCH on the one carrier. In an embodiment, in a case where the CIF index in the DCI corresponds to the second group of carriers, the CIF index in the CIF is mapped to at least one carrier in the second group of carriers, and the DCI schedules the PDSCH on the at least one carrier. In a case where the CIF index indicated by the CIF in the DCI is mapped to N carriers, the DCI schedules PDSCHs on the N carriers, and one of the PDSCHs is scheduled on each of the N carriers, where N is a positive integer greater than 1.

In an embodiment, the PDSCH configuration information includes time domain resource indication information, and in a case where $K_0$ in the time domain resource indication information is equal to 0, the $K_0$ is used for indicating a first slot satisfying a preset time between a scheduling moment of a PDSCH on each carrier and a physical downlink control channel (PDCCH) corresponding to the scheduling moment.

In this embodiment, in the case where one DCI schedules PDSCH on a plurality of carriers, a moment at which PDSCH is scheduled on each carrier and a time interval between PDCCH are different due to the different sub-carrier intervals of each carrier. In order to reduce a scheduling delay on the carrier, $K_0$ equals 0 can be re-interpreted, that is, different carriers have different interpretations for $K_0$ equals 0, so as to satisfy the preset time between the scheduling moment of the PDSCH on each carrier and the corresponding PDCCH, thereby improving the scheduling flexibility and reducing the scheduling delay.

Figure 2:
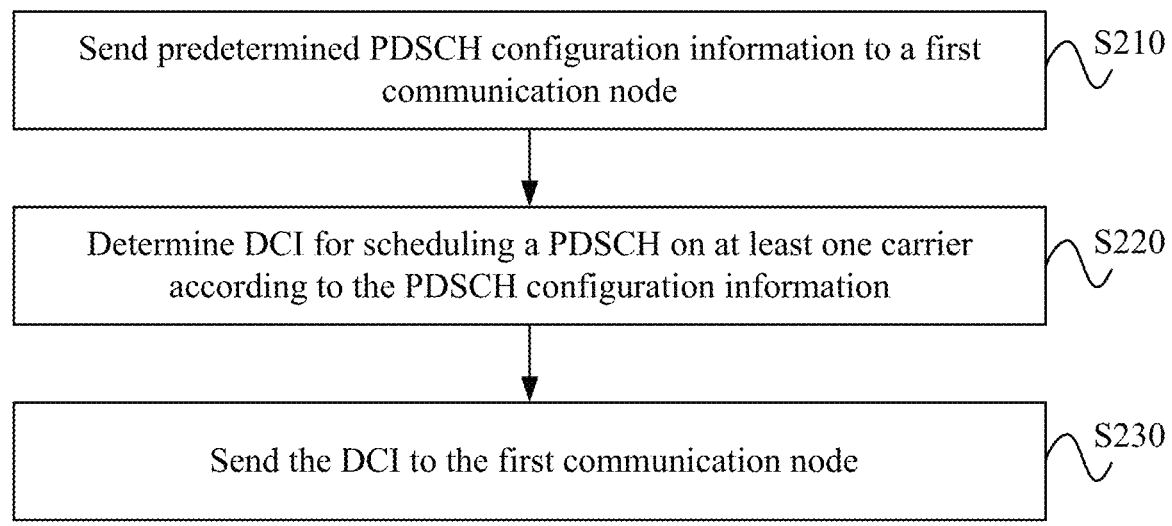
FIG. 2 is a flowchart of another information scheduling method according to an embodiment of the present application.

FIG. 2 is a flowchart of another information scheduling method according to an embodiment of the present application. The present embodiment is applied to a second communication node. Exemplarily, the second communication node may be a base station or a network side (a core network). As shown in FIG. 2, this embodiment includes S210 to S230.

In S210, Predetermined PDSCH configuration information is sent to a first communication node.

In S220, DCI used for scheduling a PDSCH on at least one carrier is determined according to the PDSCH configuration information.

In S230, the DCI is sent to the first communication node.

In an embodiment, the PDSCH configuration information includes a total number M of carriers schedulable to the DCI, and a radio network temporary identifier (RNTI) used for indicating the DCI to currently schedule a PDCSH on one or N carriers, where N is a positive integer greater than 1 and less than or equal to M.

In an embodiment, the PDSCH configuration information includes: a mapping relationship between a CIF index and a carrier, and each CIF index is mapped to at least one carrier.

In an embodiment, a CIF in the DCI indicates the CIF index, and a carrier mapped by the CIF index is a carrier on which the DCI currently schedules the PDCSH; in a case where the CIF index indicated by the CIF is mapped to N carriers, the DCI is used for scheduling PDSCHs on the N carriers, and one of the PDSCHs is scheduled on each of the N carriers, where N is a positive integer greater than 1; and in a case where the CIF index indicated by the CIF is mapped to one carrier, the DCI is used for scheduling a PDSCH on the one carrier.

In an embodiment, the PDSCH configuration information includes a mapping relationship between a TDRA index and at least one group of time domain resource indication information, and each of the at least one group of time domain resource indication information includes a slot offset $K_0$, a SLIV and a PDSCH mapping type.

In an embodiment, each group of time domain resource indication information includes the same $K_0$.

In an embodiment, each group of time domain resource indication information includes the same SLIV.

In an embodiment, the PDSCH configuration information further includes a mapping relationship between the each of the at least one group of time domain resource indication information and a carrier.

In an embodiment, a TDRA field in the DCI indicates the TDRA index; in a case where the TDRA index is mapped to N groups of time domain resource indication information, the DCI is used for scheduling PDSCHs on carriers corresponding to the N groups of time domain resource indication information, and one of the PDSCHs is scheduled on each of the carriers, where N is a positive integer greater than 1; and in a case where the TDRA index is mapped to one group of time domain resource indication information, the DCI is used for scheduling a PDSCH on a carrier corresponding to the one group of time domain resource indication information.

In an embodiment, a TDRA field of the DCI and a CIF field in the DCI jointly indicate the TDRA index.

In an embodiment, a CIF in the DCI indicates a CIF index, the CIF index is mapped to at least one carrier, and a TDRA field of the DCI indicates the TDRA index; in a case where the CIF index indicated by the CIF in the DCI is mapped to N carriers, and the TDRA index indicated by the TDRA field of the DCI is mapped to N groups of time domain resource indication information, the DCI is used for scheduling PDSCHs on the N carriers, and one of the PDSCHs is scheduled on each of the N carriers, where N is a positive integer greater than 1; and in a case where the CIF index indicated by the CIF in the DCI is mapped to one carrier, and the TDRA index indicated by the TDRA field of the DCI is mapped to one group of time domain resource indication information, the DCI is used for scheduling a PDSCH on the one carrier.

In an embodiment, a number of groups of time domain resource indication information mapped by the TDRA index indicated by the TDRA field in the DCI is same as a number of carriers mapped by the CIF index indicated by the CIF in the DCI.

In an embodiment, a CIF in the DCI is used for indicating a CIF index, and the CIF index is mapped to a carrier of which one CIF index is i; and in a case where a TDRA index indicated by a TDRA field in the DCI is mapped to N groups of time domain resource indication information, the DCI is used for scheduling PDSCHs on N carriers of which CIF indexes are respectively imodM, (i+1)modM, . . . , (i+N−1)modM, and one of the PDSCHs is scheduled on each of the N carriers, where M is a total number of carriers schedulable to the DCI, N is a positive integer greater than 1, and mod is a remainder operation.

In an embodiment, the DCI indicates two CIFs, each of the two CIFs indicates one CIF index, and each CIF index is mapped to one carrier.

In an embodiment, the PDSCH configuration information includes: a mapping relationship between a CIF index and two groups of carriers, where a first group of carriers includes one carrier, and a second group of carriers includes at least one carrier.

In an embodiment, in a case where the CIF index corresponds to the first group of carriers, the DCI is used for scheduling a PDSCH on the one carrier mapped by the CIF index in the first group of carriers; and in a case where the CIF index corresponds to the second group of carriers, the DCI is used for scheduling a PDSCH on the at least one carrier mapped by the CIF index in the second group of carriers, and one PDSCH is scheduled on each of the at least one carrier.

In an embodiment, the PDSCH configuration information includes time domain resource indication information, and in a case where $K_0$ in the time domain resource indication information is equal to 0, the $K_0$ is used for indicating a first slot satisfying a preset time between a scheduling moment of a PDSCH on each carrier and a PDCCH corresponding to the scheduling moment.

In an implementation, in the existing 5G systems and standards, in a case where the RRC signaling configures one carrier for cross-carrier scheduling, the RRC signaling configures a corresponding scheduling carrier and a corresponding CIF index for the one carrier. Among all carriers scheduled by the same carrier, each CIF index corresponds to one carrier, and each DCI can only schedule the PDSCH on one carrier at a time, thus increasing the load of 5G system transmitting control signaling.

In this embodiment, the PDSCH configuration information configures a total number M of carriers schedulable to the DCI through the RRC signaling and a RNTI used for indicating the DCI to currently schedule a PDCSH on one or N carriers, so as to reduce the load of the control signaling transmitted by 5G system. N is a positive integer greater than 1 and smaller than or equal to M. That is, the total number of carriers schedulable to the DCI is directly configured through the RRC signaling, and the second communication node configures different RNTIs for distinguishing whether the DCI schedules the PDSCH on one carrier or the PDSCHs on N carriers. The second communication node transmits the DCI to the first communication node through a PDCCH channel, and the first communication node determines the RNTI through blind-detecting the PDCCH, thereby determining whether the DCI schedules the PDSCH on one carrier or the PDSCHs on N carriers.

Assuming that the RRC signaling configures two carriers for the first communication node, i.e. carrier A (corresponding to carrier index 0) and carrier B (corresponding to carrier index 1). At this time, the total number of carriers schedulable to the DCI is 2. The RRC signaling configures the DCI on carrier A to schedule a carrier with a carrier index of 0 (i.e. carrier A) and a carrier with a carrier index of 1 (i.e. carrier B). In addition, the RRC signaling configures two RNTIs, i.e. RNTI1 and RNTI2, where RNTI1 is used for indicating the DCI on carrier A to schedule a PDSCH on one carrier (carrier A) this time, and RNTI2 is used for indicating the DCI on carrier A to schedule PDSCHs on two carriers (carrier A and carrier B) this time. In the case where the first communication node blindly detects the DCI on the PDCCH channel through RNTI1, the DCI schedules the PDSCH on carrier A. In a case where the first communication node blindly detects the DCI over the PDCCH channel through RNTI2, the DCI schedules the PDSCHs on carrier A and carrier B, and one PDSCH is scheduled on each carrier.

In an implementation, in the existing 5G systems and standards, in a case where the RRC signaling configures one carrier for cross-carrier scheduling, the RRC signaling configures a corresponding scheduling carrier and a corresponding CIF index for the one carrier. Among all carriers scheduled by the same carrier, and each CIF index corresponds to one carrier, that is, each DCI can only schedule the PDSCH on one carrier at a time, thus increasing the load of 5G system transmitting control signaling.

In an embodiment, the PDSCH configuration information configures a mapping relationship between the CIF index and the carrier, and each CIF index can be mapped to at least one carrier, so as to reduce the load of 5G system transmitting the control signaling. That is, the second communication node notifies the first communication node of the mapping relationship between the CIF index and the carrier, and one CIF index is mapped to at least one carrier. In a case where the CIF index indicated by the CIF in the DCI is mapped to N carriers, the DCI schedules PDSCHs on the N carriers, and one of the PDSCHs is scheduled on each of the N carriers, where N is a positive integer greater than 1. In a case where the CIF index indicated by the CIF in the DCI is mapped to one carrier, the DCI schedules a PDSCH on the one carrier.

In this embodiment, the second communication node notifies the first communication node of the mapping relationship between the CIF index and the carriers through the RRC signaling. The RRC signaling configures the same scheduling carrier and the same CIF index on at least one carrier. In a case where the CIF index indicated by the CIF in the DCI is mapped to N carriers, the DCI schedules PDSCHs on the N carriers, and one of the PDSCHs is scheduled on each of the N carriers, where N is a positive integer greater than 1. In a case where the CIF index indicated by the CIF in the DCI is mapped to one carrier, the DCI schedules a PDSCH on the one carrier. In an embodiment, the second communication node may notify the first communication node of the mapping relationship between the CIF index and at least one carrier through a media access control-control element (MAC CE) or DCI.

Assuming that the RRC signaling configures carrier A for cross-carrier scheduling carrier B, carrier C and carrier D, the RRC signaling configures a carrier index of carrier A to be 0, a scheduling carrier index of carrier B and a CIF index to be 0 and 1, respectively, a scheduling carrier index of carrier C and a CIF index to be 0 and 1, respectively, and a scheduling carrier index of carrier D and a CIF index to be 0 and 2, respectively. If the CIF index indicated by the CIF in the DCI on carrier A is 1, the DCI schedules one PDSCH on carrier B and carrier C respectively. If the CIF index indicated by the CIF in the DCI on carrier A is 2, the DCI schedules a PDSCH on carrier D.

In an embodiment, the second communication node notifies the first communication node of the mapping relationship between the CIF index and the carriers through the RRC signaling. The RRC signaling configures the mapping relationship between the CIF index and the carrier index on the scheduling carrier.

Assuming that the RRC signaling configures four carriers for the first communication node, i.e. carrier A, carrier B, carrier C and carrier D, and the corresponding carrier indexes are 0, 1, 2 and 3, respectively. The RRC signaling configures carrier A for cross-carrier scheduling carrier B, carrier C and carrier D. Table 1 is a mapping relationship table between the CIF index and the carrier index configured by the RRC signaling. As shown in table 1, in a case where the CIF index indicated by the CIF in the DCI is 0, the DCI schedules the PDSCH on the carrier A; in a case where the CIF index indicated by the CIF in the DCI is 1, 2 or 3 respectively, the DCI respectively schedules the PDSCH on the corresponding carrier B, carrier C or carrier D (i.e., the CIF index is 1 and the PDSCH on the carrier B is scheduled; the CIF index is 2 and the PDSCH on the carrier C is scheduled; the CIF index is 3 and the PDSCH on the carrier D is scheduled); in a case where the CIF index indicated by the CIF in the DCI is 4 or 5, since the CIF index is mapped to two carriers, the DCI schedules PDSCHs on the corresponding two carriers. If the CIF index indicated by the CIF in the DCI is 4, the DCI schedules one PDSCH on carrier A and carrier B respectively. If the CIF index indicated by the CIF in the DCI is 5, the DCI schedules one PDSCH on carrier C and carrier D respectively. If the CIF index indicated by the CIF in the DCI is 6, the DCI schedules one PDSCH on carrier A, carrier B and carrier C respectively. If the CIF index indicated by the CIF in the DCI is 7, the DCI schedules one PDSCH on carrier A, carrier B, carrier C and carrier D respectively.

TABLE 1 a mapping relationship table between the CIF index and the carrier index

| CIF index | Carrier index |
| --- | --- |
| 0 | 0 |
| 1 | 1 |
| 2 | 2 |
| 3 | 3 |
| 4 | 0 and 1 |
| 5 | 2 and 3 |
| 6 | 0 and 1 and 2 |
| 7 | 0 and 1 and 2 and 3 |

In an embodiment, Table 2 is another mapping relationship table between the CIF index and the carrier index configured by the RRC signaling. In order to reduce the design complexity of the DCI, the 5G system can limit the maximum number of carriers that each DCI can schedule at a time. Assuming that the 5G system limits DCI to schedule up to 2 carriers at a time, the mapping relationship between CIF index and carrier index is described in table 2, in the same context, the explanation in table 2 can refer to the explanation in table 1 and will not be repeated here. In an embodiment, the second communication node can notify the first communication node of the mapping relationship between the CIF index and the two groups of carriers through the MAC CE or the DCI.

TABLE 2 another mapping relationship table between the CIF index and the carrier index

| CIF index | Carrier index |
| --- | --- |
| 0 | 0 |
| 1 | 1 |
| 2 | 2 |
| 3 | 3 |
| 4 | 0 and 1 |
| 5 | 1 and 2 |
| 6 | 2 and 3 |
| 7 | 0 and 2 |

In an implementation, in the existing 5G systems and standards, the DCI signaling indicates the scheduled carrier through the CIF, and indicates a slot and a symbol of the PDSCH on the scheduled carrier through the TDRA field. Since the CIF in the DCI can only indicate one carrier at a time, and the TDRA field can only indicate the slot and the symbol where the PDSCH scheduled on one carrier is located, one DCI scheduling the PDSCHs on a plurality of carriers is limited.

In an embodiment, the second communication node configures a mapping relationship between a TDRA index and at least one group of time domain resource indication information in the PDSCH configuration information through the RRC signaling, and each of the at least one group of time domain resource indication information includes one slot offset K0, one SLIV and one PDSCH mapping type. The second communication node notifies the first communication node of the mapping relationship between each of at least one group of time domain resource indication information and the carrier, so as to implement one DCI to schedule a PDSCH on at least one carrier. A TDRA field in the DCI indicates the TDRA index, in a case where the TDRA index is mapped to N groups of time domain resource indication information, the DCI is used for scheduling PDSCHs on carriers corresponding to the N groups of time domain resource indication information, and one of the PDSCHs is scheduled on each of the carriers, where N is a positive integer greater than 1; and in a case where the TDRA index is mapped to one group of time domain resource indication information, the DCI is used for scheduling a PDSCH on a carrier corresponding to the one group of time domain resource indication information. In an embodiment, the second communication node can notify the first communication node of the mapping relationship between the TDRA index and at least one group of time domain resource indication information through the MAC CE or the DCI.

Table 3 is a mapping relationship table among a TDRA index, time domain resource indication information and a carrier according to an embodiment of the present application. As shown in table 3, the RRC signaling configures a plurality of groups of time domain resource indication information, a mapping relationship between the TDRA index and the plurality of time domain resource indication information, and a mapping relationship between the plurality of time domain resource indication information and the carrier. For a certain TDRA index, in a case where the corresponding $K_0$, a SLIV and a PDSCH mapping type are not configured for a certain carrier, if the TDRA field in the DCI indicates the TDRA index, the DCI does not schedule the PDSCH on the carrier.

Assuming that the RRC signaling configures three carriers for the first communication node, i.e. carrier A, carrier B and carrier C. Carrier A schedules carrier B and carrier C across carriers. The TDRA index 0 corresponds to time domain resource indication information on carrier A, in a case where the TDRA field in the DCI indicates the TDRA index 0, the DCI schedules the PDSCH on carrier A, and K0, the SLIV and the PDSCH mapping type corresponding to the PDSCH are K0_A0, S_A0 and M_A0, respectively. Similarly, the TDRA index 1 and the TDRA index 2 correspond to time domain resource indication information on carrier B and carrier C, respectively. In a case where the TDRA field in the DCI indicates the TDRA index 1 or the TDRA index 2, the DCI schedules a PDSCH on carrier B or carrier C, respectively.

The TDRA index 3 corresponds to time domain resource indication information on carrier A and carrier B. In a case where the TDRA field in the DCI indicates the TDRA index 3, the DCI schedules a PDSCH on carrier A and carrier B, and one PDSCH is scheduled on each carrier. In this scheduling, K0, a SLIV and a PDSCH mapping type of the PDSCH scheduled on carrier A are K0_A3, S_A3 and M_A3 respectively. $K_0$, a SLIV and a PDSCH mapping type of the PDSCH scheduled on carrier B are K0_B3, S_B3, and M_B3, respectively. Similarly, if the TDRA field in the DCI indicates the TDRA index 4, the DCI schedules a PDSCH on carrier B and carrier C, one PDSCH is scheduled on each carrier. If the TDRA field in the DCI indicates the TDRA index 5, the DCI schedules a PDSCH on carrier A and carrier C, one PDSCH is scheduled on each carrier.

The TDRA index 6 corresponds to time domain resource indication information on carrier A and carrier B. In a case where the TDRA field in the DCI indicates the TDRA index 6, the DCI schedules a PDSCH on carrier A and carrier B, and one PDSCH is scheduled on each carrier. In this scheduling, $K_0$, a SLIV and a PDSCH mapping type of the PDSCH scheduled on carrier A are K0_A6, S_A6 and M_A6 respectively. $K_0$, a SLIV and a PDSCH mapping type of the PDSCH scheduled on carrier B are K0_B6, S_B6, and M_B6, respectively. $K_0$, a SLIV and a PDSCH mapping type of the PDSCH scheduled on carrier C are K0_C6, S_C6 and M_C6 respectively.

TABLE 3 a mapping relationship table among a TDRA index, time domain resource indication information and a carrier

| TDRA index | Time domain resource indication information of carrier A | | | Time domain resource indication information of carrier B | | | Time domain resource indication information of carrier C | | |
|---|---|---|---|---|---|---|---|---|---|
| | $K_0$ | PDSCH mapping type | SLIV | $K_0$ | PDSCH mapping type | SLIV | $K_0$ | PDSCH mapping type | SLIV |
| 0 | K0_A0 | M_A0 | S_A0 | | | | | | |
| 1 | | | | K0_B1 | M_B1 | S_B1 | | | |
| 2 | | | | | | | K0_C2 | M_C2 | S_C2 |
| 3 | K0_A3 | M_A3 | S_A3 | K0_B3 | M_B3 | S_B3 | | | |
| 4 | | | | K0_B4 | M_B4 | S_B4 | K0_C4 | M_C4 | S_C4 |
| 5 | K0_A5 | M_A5 | S_A5 | | | | K0_C5 | M_C5 | S_C5 |
| 6 | K0_A6 | M_A6 | S_A6 | K0_B6 | M_B6 | S_B6 | K0_C6 | M_C6 | S_C6 |

In an embodiment, the second communication node notifies the first communication node of a mapping relationship between a TDRA index and at least one group of time domain resource indication information, and each of the at least one group of time domain resource indication information includes one slot offset $K_0$, one SLIV and one PDSCH mapping type. At least one group of time domain resource indication information includes the same $K_0$. In an embodiment, the second communication node can notify the first communication node of the mapping relationship between the TDRA index and at least one group of time domain resource indication information through the MAC CE or the DCI. In an embodiment, the second communication node can notify the first communication node of a mapping relationship between each of at least one group of time domain resource indication information and a carrier through the MAC CE or the DCI.

The second communication node notifies the first communication node of the mapping relationship between the each of the at least one group of time domain resource indication information and the carrier. A TDRA field in the DCI indicates the TDRA index, in a case where the TDRA index is mapped to N groups of time domain resource indication information, the DCI is used for scheduling PDSCHs on carriers corresponding to the N groups of time domain resource indication information, and one of the PDSCHs is scheduled on each of the carriers, where N is a positive integer greater than 1; and in a case where the TDRA index is mapped to one group of time domain resource indication information, the DCI is used for scheduling a PDSCH on a carrier corresponding to the one group of time domain resource indication information. In an embodiment, a base station can notify the mapping relationship between the TDRA index and at least one group of time domain resource indication information through the MAC CE or the DCI.

Table 4 is another mapping relationship table among a TDRA index, time domain resource indication information and a carrier according to an embodiment of the present application. As shown in table 4, at least one group of time domain resource indication information is configured by the RRC signaling, and the at least one group of time domain resource indication information includes the same $K_0$. For a certain TDRA index, in a case where the corresponding SLIV and a PDSCH mapping type are not configured for a certain carrier, if the TDRA field in the DCI indicates the TDRA index, the DCI does not schedule the PDSCH on the carrier.

Assuming that the RRC signaling configures three carriers for the first communication node, i.e. carrier A, carrier B and carrier C. Carrier A schedules carrier B and carrier C across carriers. The TDRA index 0 corresponds to time domain resource indication information on carrier A, in a case where the TDRA field in the DCI indicates the TDRA index 0, the DCI schedules the PDSCH on carrier A, and $K_0$, the SLIV and the PDSCH mapping type corresponding to the PDSCH are K0_0, S_A0 and M_A0, respectively. Similarly, the TDRA index 1 and the TDRA index 2 correspond to time domain resource indication information on carrier B and carrier C, respectively. In a case where the TDRA field in the DCI indicates the TDRA index 1 or the TDRA index 2, the DCI schedules a PDSCH on carrier B or carrier C, respectively.

The TDRA index 3 corresponds to time domain resource indication information on carrier A and carrier B. In a case where the TDRA field in the DCI indicates the TDRA index 3, the DCI schedules a PDSCH on carrier A and carrier B, and one PDSCH is scheduled on each carrier. In this scheduling, $K_0$, a SLIV and a PDSCH mapping type of the PDSCH scheduled on carrier A are K0_3, S_A3 and M_A3 respectively. $K_0$, a SLIV and a PDSCH mapping type of the PDSCH scheduled on carrier B are K0_3, S_B3, and M_B3, respectively. Similarly, if the TDRA field in the DCI indicates the TDRA index 4, the DCI schedules a PDSCH on carrier B and carrier C, one PDSCH is scheduled on each carrier. In a case where the TDRA field in the DCI indicates the TDRA index 5, the DCI schedules a PDSCH on carrier A and carrier C, one PDSCH is scheduled on each carrier.

The TDRA index 6 corresponds to time domain resource indication information on carrier A and carrier B. In a case where the TDRA field in the DCI indicates the TDRA index 6, the DCI schedules a PDSCH on carrier A and carrier B, and one PDSCH is scheduled on each carrier. In this scheduling, $K_0$, a SLIV and a PDSCH mapping type of the PDSCH scheduled on carrier A are K0_6, S_A6 and M_A6 respectively. $K_0$, a SLIV and a PDSCH mapping type of the PDSCH scheduled on carrier B are K0_6, S_B6, and M_B6, respectively. $K_0$, a SLIV and a PDSCH mapping type of the PDSCH scheduled on carrier C are K0_6, S_C6 and M_C6 respectively.

TABLE 4 another mapping relationship table among a TDRA index, time domain resource indication information and a carrier

| TDRA index | $K_0$ | Carrier A PDSCH mapping type | Carrie A SLIV | Carrier B PDSCH mapping type | Carrier B SLIV | Carrier C PDSCH mapping type | Carrier C SLIV |
|---|---|---|---|---|---|---|---|
| 0 | K0_0 | M_A0 | S_A0 | | | | |
| 1 | K0_1 | | | M_B1 | S_B1 | | |
| 2 | K0_2 | | | | | M_C2 | S_C2 |
| 3 | K0_3 | M_A3 | S_A3 | M_B3 | S_B3 | | |
| 4 | K0_4 | | | M_B4 | S_B4 | M_C4 | S_C4 |
| 5 | K0_5 | M_A5 | S_A5 | | | M_C5 | S_C5 |
| 6 | K0_6 | M_A6 | S_A6 | M_B6 | S_B6 | M_C6 | S_C6 |

In an implementation, in the existing 5G systems and standards, the DCI indicates the scheduled carrier through the CIF, and indicates a slot and a symbol of the PDSCH on the scheduled carrier through the TDRA field. In the embodiment of establishing a mapping relationship between a TDRA index and the time domain resource indication information, and between time domain resource indication information and a carrier, the first communication node determines a carrier where the DCI currently schedules the PDSCH through the TDRA field in the DCI, and the CIF does not need to do a carrier indication at this time.

In this embodiment, in order to make full use of the CIF, the TDRA index is indicated jointly by the CIF and the TDRA field. Assume that the CIF is represented by X (X is a positive integer) bits and its corresponding decimal value is CIF_X. The TDRA field is represented by Y (Y is a positive integer) bits and its corresponding decimal value is TDRA_Y. In a case where the TDRA index is jointly indicated by the CIF and the TDRA field, and the CIF is in a high bit and the TDRA field is in a low bit, the TDRA index jointly indicated by the CIF and the TDRA field is CIF_X*2^Y+TDRA_Y that is, the TDRA index is a sum of the product value of CIF_X and the Y power of 2 and TDRA_Y. In a case where the CIF is in a low bit and the TDRA field is in a high bit, the TDRA index jointly indicated by the CIF and the TDRA field is TDRA_Y*2^X+CIF_X, that is, the TDRA index is a sum of the product value of TDRA_Y and the X power of 2 and CIF_X.

In a case where the TDRA index is indicated by the TDRA field alone, there may be at most $2^Y$ configurations; in a case where the TDRA index is indicated jointly by the CIF and the TDRA field, at most $2^{(X+Y)}$ configurations can be indicated, thus increasing the range of the TDRA index and improving the flexibility of the TDRA table configuration.

Assuming that CIF is represented by 3 bits and TDRA field is represented by 4 bits, in a case where the TDRA field is used for indicating the TDRA index alone, only 16 configurations can be indicated at most. In the case where the CIF and the TDRA field jointly indicate the TDRA index, a total of 7 bits can indicate 128 configurations at most. Assuming that the CIF is the high bit and the TDRA field is the low bit, in a case where the decimal value indicated by the CIF is 2 and the decimal value indicated by the TDRA field is 7, the TDRA index indicated jointly by the CIF and the TDRA field is 2*2^4+7=39. Exemplarily, Table 5 is a schematic table of a range of a TDRA index indicated jointly by a CIF and a TDRA field according to an embodiment of the present application. As shown in table 5, at this time, the DCI indicates time domain resource indication information on carrier A and carrier B.

Figure 5:
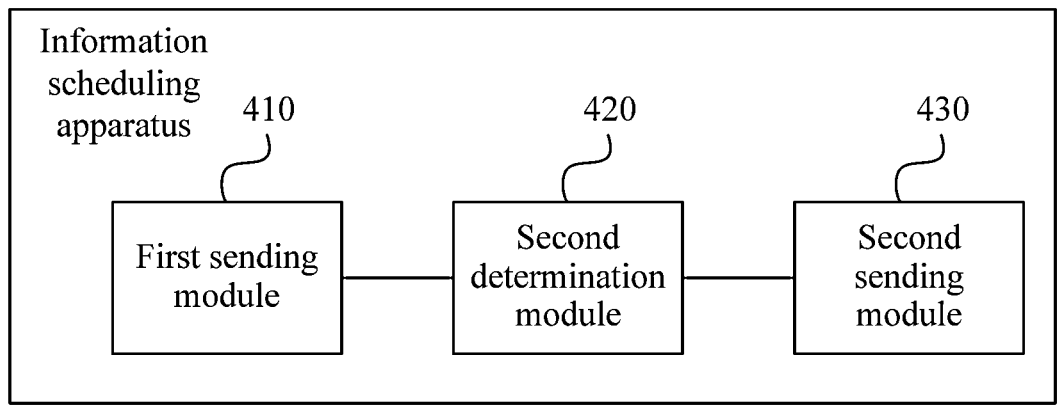
FIG. 5 is a block diagram illustrating the structure of another information scheduling apparatus according to an embodiment of the present application.

Assuming that the CIF is the low bit and the TDRA field is the high bit, in a case where the decimal value indicated by the CIF is 2 and the decimal value indicated by the TDRA field is 7, the TDRA index indicated jointly by the CIF and the TDRA field is 7*2^3+2=58. As shown in FIG. 5, at this time, the DCI indicates time domain resource indication information on carrier A and carrier C.

TABLE 5 a schematic table of a range of a TDRA index indicated jointly by a CIF and a TDRA field

| TDRA index | $K_0$ | Carrier A PDSCH mapping type | Carrier A SLIV | Carrier B PDSCH mapping type | Carrier B SLIV | Carrier C PDSCH mapping type | Carrier C SLIV |
|---|---|---|---|---|---|---|---|
| 0 | K0_0 | M_A0 | S_A0 | | | | |
| 1 | K0_1 | | | M_B1 | S_B1 | | |
| 2 | K0_2 | | | | | M_C2 | S_C2 |
| 3 | K0_3 | M_A3 | S_A3 | M_B3 | S_B3 | | |
| 4 | K0_4 | | | M_B4 | S_B4 | M_C4 | S_C4 |
| 5 | K0_5 | M_A5 | S_A5 | | | M_C5 | S_C5 |
| 6 | K0_6 | M_A6 | S_A6 | M_B6 | S_B6 | M_C6 | S_C6 |
| ... | | | | | | | |
| 39 | K0_39 | M_A39 | S_A39 | M_B39 | S_B39 | | |
| ... | | | | | | | |
| 58 | K0_58 | M_A58 | S_A58 | | | M_C58 | S_C58 |
| ... | | | | | | | |
| 125 | K0_125 | | | M_B125 | S_B125 | M_C125 | S_C125 |
| 126 | K0_126 | M_A126 | S_A126 | M_B126 | S_B126 | M_C126 | S_C126 |
| 127 | K0_127 | M_A127 | S_A127 | M_B127 | S_B127 | M_C127 | S_C127 |

In an implementation and the existing 5G systems and standards, since the CIF in the DCI can only indicate one carrier at a time, and the TDRA field can only indicate the slot and the symbol where the PDSCH scheduled on one carrier is located, one DCI scheduling the PDSCHs on a plurality of carriers is limited and the load for transmitting control signaling is reduced.

In this embodiment, the second communication node notifies the first communication node of a mapping relationship between a TDRA index and at least one group of time domain resource indication information, each of the at least one group of time domain resource indication information includes one slot offset $K_0$, one SLIV and one PDSCH mapping type, the CIF in the DCI indicates the CIF index, and the CIF index is mapped to at least one carrier, so that one DCI scheduling the PDSCHs on a plurality of carriers is achieved. In a case where the CIF index indicated by the CIF in the DCI is mapped to N carriers, and the TDRA index indicated by the TDRA field of the DCI is mapped to N groups of time domain resource indication information, the DCI is used for scheduling PDSCHs on the N carriers, one of the PDSCHs is scheduled on each of the N carriers, and each group of time domain resource indication information corresponds to a PDSCH scheduled on one carrier, where N is an positive integer greater than 1. In a case where the CIF index indicated by the CIF in the DCI is mapped to one carrier, and the TDRA index indicated by the TDRA field of the DCI is mapped to one group of time domain resource indication information, the DCI schedules a PDSCH on the one carrier.

In an embodiment, a number of groups of time domain resource indication information mapped by the TDRA index indicated by the TDRA field in the DCI is same as a number of carriers mapped by the CIF index indicated by the CIF in the DCI.

Table 6 is another mapping relationship table among a TDRA index, time domain resource indication information and a carrier according to an embodiment of the present application. As shown in table 6, a plurality of groups of time domain resource indication information is configured in one TDRA table. Assuming that the RRC signaling configures three carriers for the first communication node, i.e. carrier A, carrier B and carrier C. Carrier A schedules carrier B and carrier C across carriers. The CIF indicates that one or more carriers have been described in the above embodiments and will not be repeated herein. In a case where the CIF in the DCI indicates carrier A, and the TDRA index indicated by the TDRA field is 0, the DCI schedules the PDSCH on carrier A, and $K_0$, the SLIV and the PDSCH mapping type corresponding to the PDSCH are K0_10, S_10 and M_10, respectively. If the CIF in the DCI indicates carrier B, and the TDRA index indicated by the TDRA field is 0, the DCI schedules the PDSCH on carrier B, and $K_0$, the SLIV and the PDSCH mapping type corresponding to the PDSCH are K0_10, S_10 and M_10, respectively.

If the CIF in the DCI indicates carrier A and carrier B, in order to ensure that a number of groups of time domain resource indication information mapped by the TDRA index indicated by the TDRA field in the DCI is same as a number of carriers mapped by the CIF index indicated by the CIF in the DCI, the TDRA index indicated by the TDRA field can only be 3, 4 or 5. Assuming that the TDRA index indicated by the TDRA field is 4, the DCI schedules a PDSCH on carrier A and carrier B, $K_0$, the SLIV and the PDSCH mapping type corresponding to the PDSCH scheduled on carrier A are K0_14, S_14 and M_14, respectively, and $K_0$, the SLIV and the PDSCH mapping type corresponding to the PDSCH scheduled on carrier B are K0_24, S_24 and M_24, respectively. If the CIF in the DCI indicates carrier B and carrier C, and the TDRA index indicated by the TDRA field is 4, the DCI schedules a PDSCH on carrier B and carrier C, $K_0$, the SLIV and the PDSCH mapping type corresponding to the PDSCH scheduled on carrier B are K0_14, S_14 and M_14, respectively, and $K_0$, the SLIV and the PDSCH mapping type corresponding to the PDSCH scheduled on carrier C are K0_24, S_24 and M_24, respectively.

If the CIF in the DCI indicates carrier A, carrier B and carrier C, in order to ensure that a number of groups of time domain resource indication information mapped by the TDRA index indicated by the TDRA field in the DCI is same as a number of carriers mapped by the CIF index indicated by the CIF in the DCI, and the TDRA index indicated by the TDRA field can only be 6, the DCI schedules a PDSCH on carrier A, carrier B and carrier C, $K_0$, the SLIV and the PDSCH mapping type corresponding to the PDSCH scheduled on carrier A are K0_16, S_16 and M_16, respectively, $K_0$, the SLIV and the PDSCH mapping type corresponding to the PDSCH scheduled on carrier B are K0_26, S_26 and M_26, respectively, and $K_0$, the SLIV and the PDSCH mapping type corresponding to the PDSCH scheduled on carrier C are K0_36, S_36 and M_36, respectively.

TABLE 6 another mapping relationship table among a TDRA index, time domain resource indication information and a carrier

| TDRA index | Time domain resource indication information of carrier 1 | | | Time domain resource indication information of carrier 2 | | | Time domain resource indication information of carrier 3 | | |
|---|---|---|---|---|---|---|---|---|---|
| | $K_0$ | PDSCH mapping type | SLIV | $K_0$ | PDSCH mapping type | SLIV | $K_0$ | PDSCH mapping type | SLIV |
| 0 | K0_10 | M_10 | S_10 | | | | | | |
| 1 | K0_11 | M_11 | S_11 | | | | | | |
| 2 | K0_12 | M_12 | S_12 | | | | | | |
| 3 | K0_13 | M_13 | S_13 | K0_23 | M_23 | S_23 | | | |
| 4 | K0_14 | M_14 | S_14 | K0_24 | M_24 | S_24 | | | |
| 5 | K0_15 | M_15 | S_15 | K0_25 | M_25 | S_25 | | | |
| 6 | K0_16 | M_16 | S_16 | K0_26 | M_26 | S_26 | K0_36 | M_36 | S_36 |

In an embodiment, the second communication node notifies the first communication node of a mapping relationship between a TDRA index and at least one group of time domain resource indication information, and each of the at least one group of time domain resource indication information includes one slot offset $K_0$, one SLIV and one PDSCH mapping type. At least one group of time domain resource indication information includes the same $K_0$.

A CIF in the DCI indicates a CIF index, AND the CIF index is mapped to at least one carrier. In a case where the CIF index indicated by the CIF in the DCI is mapped to N carriers, and the TDRA index indicated by the TDRA field of the DCI is mapped to N groups of time domain resource indication information, the DCI is used for scheduling PDSCHs on the N carriers, one of the PDSCHs is scheduled on each of the N carriers, and each group of time domain resource indication information corresponds to a PDSCH scheduled on one carrier, where N is a positive integer greater than 1. In a case where the CIF index indicated by the CIF in the DCI is mapped to one carrier, and the TDRA index indicated by the TDRA field of the DCI is mapped to one group of time domain resource indication information, the DCI schedules a PDSCH on the one carrier. In an embodiment, a number of groups of time domain resource indication information mapped by the TDRA index indicated by the TDRA field in the DCI is same as a number of carriers mapped by the CIF index indicated by the CIF in the DCI.

Table 7 is another mapping relationship table among a TDRA index, time domain resource indication information and a carrier according to an embodiment of the present application. As shown in table 7, a plurality of groups of time domain resource indication information is configured in one TDRA table, and the plurality of groups of time domain resource indication information includes the same $K_0$. Assuming that the RRC signaling configures three carriers for the first communication node, i.e. carrier A, carrier B and carrier C. Carrier A schedules carrier B and carrier C across carriers. The CIF indicates that one or more carriers have been described in the above embodiments and will not be repeated herein. In a case where the CIF in the DCI indicates carrier A, and the TDRA index indicated by the TDRA field is 0, the DCI schedules the PDSCH on carrier A, and $K_0$, the SLIV and the PDSCH mapping type corresponding to the PDSCH are K0_0, S_10 and M_10, respectively. In a case where the CIF in the DCI indicates carrier B, and the TDRA index indicated by the TDRA field is 0, the DCI schedules the PDSCH on carrier B, and $K_0$, the SLIV and the PDSCH mapping type corresponding to the PDSCH are K0_0, S_10 and M_10, respectively.

The CIF in the DCI indicates carrier A and carrier B, in order to ensure that a number of groups of time domain resource indication information mapped by the TDRA index indicated by the TDRA field in the DCI is same as a number of carriers mapped by the CIF index indicated by the CIF in the DCI, the TDRA index indicated by the TDRA field can only be 3, 4 or 5. Assuming that the TDRA index indicated by the TDRA field is 4, the DCI schedules a PDSCH on carrier A and carrier B, $K_0$, the SLIV and the PDSCH mapping type corresponding to the PDSCH scheduled on carrier A are K0_4, S_14 and M_14, respectively, and $K_0$, the SLIV and the PDSCH mapping type corresponding to the PDSCH scheduled on carrier B are K0_4, S_24 and M_24, respectively. In a case where the CIF in the DCI indicates carrier B and carrier C, and the TDRA index indicated by the TDRA field is 4, the DCI schedules a PDSCH on carrier B and carrier C, $K_0$, the SLIV and the PDSCH mapping type corresponding to the PDSCH scheduled on carrier B are K0_4, S_14 and M_14, respectively, and $K_0$, the SLIV and the PDSCH mapping type corresponding to the PDSCH scheduled on carrier C are K0_4, S_24 and M_24, respectively.

In a case where the CIF in the DCI indicates carrier A, carrier B and carrier C, in order to ensure that a number of groups of time domain resource indication information mapped by the TDRA index indicated by the TDRA field in the DCI is same as a number of carriers mapped by the CIF index indicated by the CIF in the DCI, and the TDRA index indicated by the TDRA field can only be 6, the DCI schedules a PDSCH on carrier A, carrier B and carrier C, $K_0$, the SLIV and the PDSCH mapping type corresponding to the PDSCH scheduled on carrier A are K0_6, S_16 and M_16, respectively, $K_0$, the SLIV and the PDSCH mapping type corresponding to the PDSCH scheduled on carrier B are K0_6, S_26 and M_26, respectively, and $K_0$, the SLIV and the PDSCH mapping type corresponding to the PDSCH scheduled on carrier C are K0_6, S_36 and M_36, respectively.

In this embodiment, in a case where a CIF in the DCI indicates a carrier of which a CIF index is i, and a TDRA index indicated by a TDRA field in the DCI is mapped to N (N is a positive integer greater than 1) groups of time domain resource indication information, the DCI schedules PDSCHs on N carriers of which CIF indexes are respectively imodM, (i+1)modM, . . . , (i+N−1)modM, and one of the PDSCHs is scheduled on each of the N carriers, and each group of time domain resource indication information corresponds to a PDSCH scheduled on one carrier. mod is a remainder operation, and M is a total number of carriers schedulable to a scheduling carrier and configured by the RRC signal. Thus, one DCI schedules PDSCHs on a plurality of carriers, thereby reducing the load of the second communication node transmitting control signaling, and the first communication node can allocate less energy for detecting the DCI, which is helpful for the first communication node to save energy.

In this embodiment, the present implementation is applicable to a scene (i.e., an example in Table 7 of the above-mentioned embodiment) in which N groups of time domain resource indication information include the same $K_0$, and is also applicable to a scene (i.e., an example in Table 6 of the above-mentioned embodiment) in which the N groups of time domain resource indication information do not include the same $K_0$. In the present implementation, table 6 is used as an example for description.

Assuming that the RRC signaling configures three carriers for the first communication node, i.e. carrier A, carrier B and carrier C. Carriers CIF indexes of carrier A, carrier B and carrier C are 0, 1 and 2, respectively. Carrier A schedules carrier B and carrier C across carriers. M is a total number of carriers schedulable to carrier A and configured by the RRC, and carrier A can schedule carrier B and carrier C, i.e. M=3.

In a case where the CIF index indicated by the CIF in the DCI is mapped to a carrier (i.e. carrier A) of which a carrier index is 0, and the TDRA index indicated by the TDRA field is 0, that is, i=0, the DCI schedules a PDSCH on the carrier (i.e. carrier A) of which the index is 0, and $K_0$, the SLIV and the PDSCH mapping type corresponding to the PDSCH are K0_10, S_10 and M_10, respectively.

TABLE 7 another mapping relationship table among a TDRA index, time domain resource indication information and a carrier

| TDRA index | $K_0$ | Carrier 1 mapping type | Carrier 1 SLIV | Carrier 2 mapping type | Carrier 2 SLIV | Carrier 3 mapping type | Carrier 3 SLIV |
| --- | --- | --- | --- | --- | --- | --- | --- |
| 0 | K0_0 | M_10 | S_10 | | | | |
| 1 | K0_1 | M_11 | S_11 | | | | |
| 2 | K0_2 | M_12 | S_12 | | | | |
| 3 | K0_3 | M_13 | S_13 | M_23 | S_23 | | |
| 4 | K0_4 | M_14 | S_14 | M_24 | S_24 | | |
| 5 | K0_5 | M_15 | S_15 | M_25 | S_25 | | |
| 6 | K0_6 | M_16 | S_16 | M_26 | S_26 | M_36 | S_36 |

In an implementation and the existing 5G systems and standards, since the CIF in the DCI can only support one carrier at a time, and the TDRA field can only indicate the slot and the symbol where the PDSCH scheduled on one carrier is located, one DCI scheduling the PDSCHs on a plurality of carriers is limited and the load for transmitting control signaling is reduced.

In a case where the CIF index indicated by the CIF in the DCI is mapped to a carrier (i.e. carrier A) of which a carrier index is 0, and the TDRA index indicated by the TDRA field is 4, that is, i=0, the DCI schedules a PDSCH on the carrier (i.e. carrier A) of which the index is 0 and a carrier (i.e. carrier B) of which an index is 1. $K_0$, a SLIV and a PDSCH mapping type corresponding to the PDSCH scheduled on carrier A are K0_14, S_14 and M_14 respectively. $K_0$, a SLIV and a PDSCH mapping type of the PDSCH scheduled on carrier B are K0_24, S_24, and M_24, respectively.

In a case where the CIF index indicated by the CIF in the DCI is mapped to a carrier (i.e. carrier B) of which a carrier index is 1, and the TDRA index indicated by the TDRA field is 4, that is, i=1, the DCI schedules a PDSCH on the carrier (i.e. carrier B) of which the index is 1 and a carrier (i.e. carrier C) of which an index is 2. $K_0$, a SLIV and a PDSCH mapping type corresponding to the PDSCH scheduled on carrier B are K0_14, S_14 and M_14 respectively. $K_0$, a SLIV and a PDSCH mapping type of the PDSCH scheduled on carrier C are K0_24, S_24, and M_24, respectively.

In a case where the CIF index indicated by the CIF in the DCI is mapped to a carrier (i.e. carrier C) of which a carrier index is 2, and the TDRA index indicated by the TDRA field is 4, that is, i=2, the DCI schedules a PDSCH on the carrier (i.e. carrier C) of which the index is 2 and the carrier (i.e. carrier A) of which the index is 0. $K_0$, a SLIV and a PDSCH mapping type corresponding to the PDSCH scheduled on carrier C are K0_14, S_14 and M_14 respectively. $K_0$, the SLIV and the PDSCH mapping type of the PDSCH scheduled on carrier A are K0_24, S_24, and M_24, respectively.

In a case where the CIF index indicated by the CIF in the DCI is mapped to a carrier (i.e. carrier A) of which a carrier index is 0, and the TDRA index indicated by the TDRA field is 6, that is, i=0, the DCI schedules a PDSCH on the carrier (i.e. carrier A) of which the index is 0, a carrier (i.e. carrier B) of which an index is 1 and a carrier (i.e. carrier C) of which an index is 2. $K_0$, a SLIV and a PDSCH mapping type corresponding to the PDSCH scheduled on carrier A are K0_16, S_16 and M_16 respectively. $K_0$, a SLIV and a PDSCH mapping type corresponding to the PDSCH scheduled on carrier B are K0_26, S_26, and M_26, respectively. $K_0$, a SLIV and a PDSCH mapping type corresponding to the PDSCH scheduled on carrier C are K0_36, S_36 and M_36 respectively.

In a case where the CIF index indicated by the CIF in the DCI is mapped to a carrier (i.e. carrier C) of which a carrier index is 2, and the TDRA index indicated by the TDRA field is 6, that is, i=2, the DCI schedules a PDSCH on the carrier (i.e. carrier C) of which the index is 2, a carrier (i.e. carrier A) of which an index is 0 and a carrier (i.e. carrier B) of which an index is 1. $K_0$, a SLIV and a PDSCH mapping type corresponding to the PDSCH scheduled on carrier C are K0_16, S_16 and M_16 respectively. $K_0$, a SLIV and a PDSCH mapping type corresponding to the PDSCH scheduled on carrier A are K0_26, S_26, and M_26, respectively. $K_0$, a SLIV and a PDSCH mapping type corresponding to the PDSCH scheduled on carrier B are K0_36, S_36 and M_36 respectively.

In the above-described embodiments, $K_0$, the SLIV and the PDSCH mapping type in tables 3 to 7 belong to the related art and will not be described herein.

In an implementation and the existing 5G systems and standards, since the CIF in the DCI can only support one carrier at a time, and the TDRA field can only indicate the slot and the symbol where the PDSCH scheduled on one carrier is located, one DCI scheduling the PDSCHs on a plurality of carriers is limited and the load of 5G system transmitting control signaling is increased.

In an embodiment, the DCI indicates two CIFs, each of the two CIFs indicates one CIF index, and each CIF index is mapped to one carrier. The DCI schedules PDSCHs on carriers mapped by CIF indexes indicated by the two CIFs, and one of the PDSCHs is scheduled on each of the carriers, so that one DCI scheduling PDSCHs on the plurality of carriers is achieved.

Assuming that the RRC signaling configures three carriers for the first communication node, i.e. carrier A, carrier B and carrier C. Carrier A schedules carrier B and carrier C across carriers, and CIF indexes of carrier A, carrier B and carrier C are 0, 1 and 2, respectively.

In a case where two CIF in the DCI indicates the CIF index 0 and the CIF index 1, respectively, the DCI schedules the PDSCHs on the carrier A and the carrier B, and one PDSCH is scheduled on each carrier. In a case where two CIF in the DCI indicates the CIF index 1 and the CIF index 2, respectively, the DCI schedules the PDSCHs on the carrier B and the carrier C, and one PDSCH is scheduled on each carrier.

In an implementation and the existing 5G systems and standards, since the CIF in the DCI can only support one carrier at a time, and the TDRA field can only indicate the slot and the symbol where the PDSCH scheduled on one carrier is located, one DCI scheduling the PDSCHs on a plurality of carriers is limited and the load of 5G system transmitting control signaling is increased.

In an embodiment, the second communication node notifies the first communication node of a mapping relationship between a CIF index and two groups of carriers, where a first group of carriers includes one carrier, and a second group of carriers includes at least one carrier. The second communication node notifies the first communication node whether the CIF index in the current DCI corresponds to the first group of carriers or the second group of carriers. In an embodiment, the second communication node can notify the first communication node of the mapping relationship between the CIF index and the two groups of carriers through the MAC CE or the DCI.

In a case where the second communication node notifies the first communication node that the CIF index in the DCI corresponds to the first group of carriers, the CIF index indicated by the CIF in the DCI is mapped to one carrier corresponding to the CIF index in the first group of carriers, and the DCI schedules the PDSCH on the one carrier.

In a case where the second communication node notifies the first communication node that the CIF index in the DCI corresponds to the second group of carriers, the CIF index indicated by the CIF in the DCI is mapped to at least one carrier corresponding to the CIF index in the second group of carriers. In a case where the CIF index indicated by the CIF in the DCI is mapped to N carriers, the DCI schedules PDSCHs on the N carriers, and one of the PDSCHs is scheduled on each of the N carriers, where N is a positive integer greater than 1. In a case where the CIF index indicated by the CIF in the DCI is mapped to one carrier, the DCI schedules a PDSCH on the one carrier.

The second communication node notifies the first communication node of the mapping relationship between the CIF index and the two groups of carriers through the RRC signaling. The RRC signaling configures the mapping relationship between the CIF index and the carrier index on the scheduling carrier. Assuming that the RRC signaling configures eight carriers for the first communication node, i.e. carrier A, carrier B, carrier C, carrier D, carrier E, carrier F, carrier G and carrier H, and the corresponding carrier indexes are 0, 1, 2, 3, 4, 5, 6, and 7, respectively. The RRC signaling configures carrier A for cross-carrier scheduling carrier B, carrier C, carrier D, carrier E, carrier F, carrier G and carrier H.

Table 8 is another mapping relationship table between the CIF index and the carrier index configured by the RRC signaling. As shown in table 8, assuming that the second communication node notifies the first communication node that the CIF index in the DCI corresponds to the first group of carriers through the RRC signaling, the CIF index indicated by the CIF in the DCI is mapped to a carrier corresponding to the CIF index in the first group of carriers. In an embodiment, in a case where the CIF index indicated by the CIF in the DCI is 0, and in a carrier index of the first group of carrier, the CIF index 0 is mapped to carrier 0, the DCI schedules a PDSCH on carrier A; in a case where the CIF index indicated by the CIF in the DCI is 2, and in a carrier index of the first group of carrier, the CIF index 2 is mapped to carrier 2, the DCI schedules a PDSCH on carrier C.

Assuming that the second communication node notifies the first communication node that the CIF index in the DCI corresponds to the second group of carriers through the RRC signaling, the CIF index indicated by the CIF in the DCI is mapped to a carrier corresponding to the CIF index in the second group of carriers. In an embodiment, in a case where the CIF index indicated by the CIF in the DCI is 0, and in the carrier index of the second group of carriers, the CIF index 0 is mapped to carrier 0 and carrier 1, the DCI schedules a PDSCH on carrier A and carrier B, and one PDSCH is scheduled on each carrier. In a case where the CIF index indicated by the CIF in the DCI is 1, and in the carrier index of the second group of carriers, the CIF index 1 is mapped to the carrier 1, the DCI schedules a PDSCH on the carrier B. In the case where the CIF index indicated by the CIF in the DCI is 6, and in the carrier index of the second group of carriers, the CIF index 6 is mapped to carrier 0, carrier 1 and carrier 2, the DCI schedules a PDSCH on carrier A, carrier B and carrier C, and one PDSCH is scheduled on each carrier.

TABLE 8 another mapping relationship table between the CIF index and the carrier index

| CIF index | Carrier index of a first group of carrier | Carrier index of a second group of carrier |
| --- | --- | --- |
| 0 | 0 | 0 and 1 |
| 1 | 1 | 1 |
| 2 | 2 | 2 |
| 3 | 3 | 3 and 6 |
| 4 | 4 | 4 and 7 |
| 5 | 5 | 5 and 7 |
| 6 | 6 | 0 and 1 and 2 |
| 7 | 7 | 0 and 1 and 2 and 3 |

In an implementation, the DCI is transmitted to the first communication node through a PDCCH, and the first communication node acquires the DCI information through blind detection. In a cross-scheduling, and a sub-carrier interval of scheduling carriers is different from a sub-carrier interval of scheduled carriers, a PDSCH scheduling needs to satisfy a preset time requirement. In 3GPP protocol, the corresponding PDCCH processing time under different sub-carrier intervals is defined, where $\mu_{PDCCH}$ represents a sub-carrier interval of the carriers where the DCI is located, and $N_{pdsch}$ represents time required by the PDCCH, which is counted by a symbol number of the PDCCH. Table 9 is a mapping relationship table between $\mu_{PDCCH}$ and $N_{pdsch}$ in the related art. As shown in table 9, in a case where $\mu_{PDCCH}$ is 0, a sub-carrier interval of the PDCCH is 15 KHz, and the corresponding processing time of the PDCCH is 4 symbols; in a case where $\mu_{PDCCH}$ is 1, a sub-carrier interval of the PDCCH is 30 KHz, and the corresponding processing time of the PDCCH is 5 symbols; in a case where $\mu_{PDCCH}$ is 2, a sub-carrier interval of the PDCCH is 60 KHz, and the corresponding processing time of the PDCCH is 10 symbols; and in a case where $\mu_{PDCCH}$ is 3, a sub-carrier interval of the PDCCH is 120 KHz, and the corresponding processing time of the PDCCH is 14 symbols. In a case where the sub-carrier interval of the PDCCH is smaller than an interval of the PDSCH scheduled by the PDCCH, the PDSCH can only start transmission at a next slot which satisfies the processing delay of the PDCCH. In a case where the sub-carrier interval of the PDCCH is greater than the interval of the PDSCH scheduled by the PDCCH, the PDSCH only needs to ensure that an interval between the PDSCH and the PDCCH is greater than the corresponding processing time of the PDCCH.

TABLE 9 a mapping relationship table between $\mu_{PDCCH}$ and $N_{pdsch}$

| $\mu_{PDCCH}$ | $N_{pdsch}$ |
| --- | --- |
| 0 | 4 |
| 1 | 5 |
| 2 | 10 |
| 3 | 14 |

According to recordation of the 3GPP protocol, in the case where self-scheduling is performed on the carrier, the scheduled time between the PDSCH and the PDCCH should satisfy the preset time requirement. For a PDSCH of which a PDSCH mapping type is TypeA, if the PDCCH for scheduling the PDSCH is not completely included in first three symbols of a slot, the PDSCH cannot be scheduled on the slot. At this time, a first slot satisfying the time requirement between the PDSCH and the PDCCH is a next slot of the slot. For a PDSCH of which a PDSCH mapping type is TypeB, a first symbol of the PDSCH cannot be earlier than a first symbol of the PDCCH that schedules the PDSCH. At this time, a first slot satisfying the time requirement between the PDSCH and the PDCCH is a slot on which the PDCCH is received.

In the existing 3GPP protocol, how to determine the slot and symbol where the PDSCH is located through K0, the PDSCH mapping type and the SLIV has been described, where K0 is used for determining a slot where the PDSCH is located. Assuming that sub-carrier intervals of the PDSCH and the PDCCH are configured to be $\mu_{PDCCH}$ and $\mu_{PDSCH}$ respectively, and the PDCCH is received on slot n, the slot number where the PDSCH is located is $$\left\lfloor n \cdot \frac{2^{\mu_{PDSCH}}}{2^{\mu_{PDCCH}}} \right\rfloor + K_0.$$

At this time, K0=0 indicates the slot $$\left\lfloor n \cdot \frac{2^{\mu_{PDSCH}}}{2^{\mu_{PDCCH}}} \right\rfloor.$$

Figure 3:
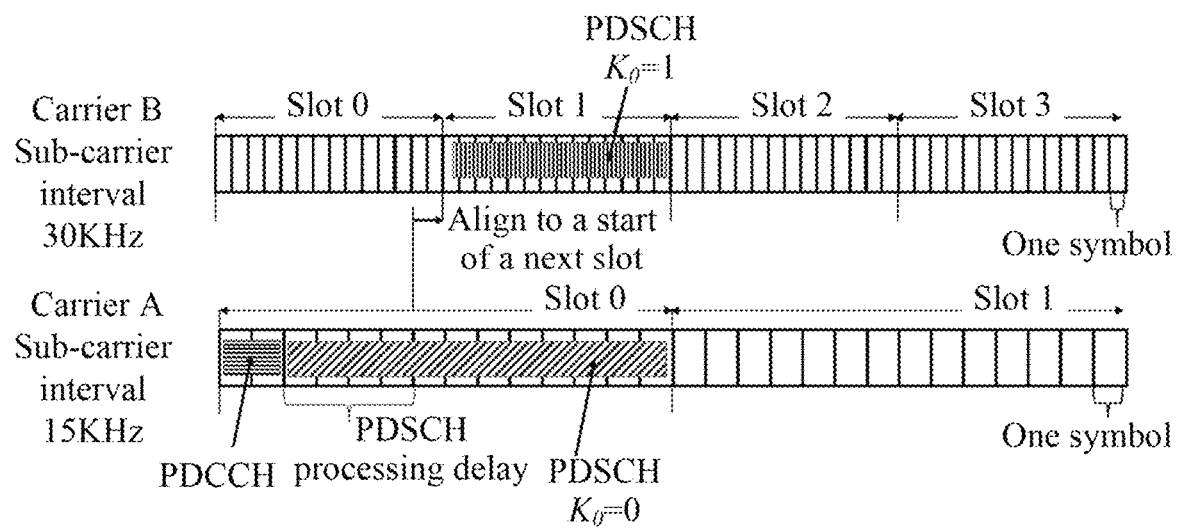
FIG. 3 is a schematic diagram of scheduling between a PDCCH and a PDSCH satisfying preset time according to an embodiment of the present application.

FIG. 3 is a schematic diagram of scheduling between a PDCCH and a PDSCH satisfying preset time according to an embodiment of the present application. Taking FIG. 3 as an example, a time requirement to be satisfied between the PDCCH and the PDSCH scheduled by the PDCCH is described. Assuming that carrier A schedules carrier B across carriers, the sub-carrier interval of carrier A is 15 KHz, and the sub-carrier interval of carrier B is 30 KHz.

Assume that both Carrier A and Carrier B schedule PDSCHs of which the PDSCH mapping types are TypeA. The PDCCH on carrier A is on the first two symbols of the slot. According to the existing protocol, in a case where carrier A schedules the PDSCH on carrier A, the PDSCH can be in the same slot as the corresponding PDCCH, that is, the minimum $K_0$ value can be configured to be 0.

In the case where carrier A schedules a PDSCH on carrier B across carriers, according to the existing 3GPP protocol, the second communication node needs to reserve a PDCCH processing delay with the length of four PDCCH symbol at first, and then the second communication node can only start schedules the PDSCH at the next slot satisfying the PDCCH processing delay. On carrier B, the PDSCH in FIG. 3 can only be scheduled from slot 1 on carrier B at the earliest, that is, the minimum $K_0$ value can only be configured to be 1.

In the case where one DCI schedules PDSCH on a plurality of carriers, the time requirement between the PDSCH scheduled on each carrier and the PDCCH scheduled on each carrier is different due to the different sub-carrier intervals of each carrier. However, in the existing 5G systems and standards, only one $K_0$ can be indicated through the TDRA field in the DCI, so that a value of $K_0$ is relatively limited. Taking FIG. 3 as an example, if the DCI on carrier A schedules the PDSCHs on carrier A and carrier B, in order to simultaneously satisfy the time requirement between the PDSCH on carrier A and the PDCCH carrying the DCI and between the PDSCH on carrier B and the PDCCH carrying the DCI, $K_0$ can only be configured to be 1 at least, resulting in that the PDSCH on carrier A can only be scheduled on slot 1 at the earliest, thus increasing the scheduling delay on carrier A.

In an embodiment, the value of $K_0$ is reinterpreted, and $K_0$ is configured to be 0 ($K_0$=0) to indicate the first slot satisfying the preset time between the scheduling moment of the PDSCH on each carrier and the corresponding PDCCH. Even if each DCI only indicates one $K_0$, different carriers have different interpretations about $K_0$ according to the delays between different PDSCHs on various carriers and the PDCCHs on various carriers, thereby improving scheduling flexibility and reducing scheduling delay.

Taking FIG. 3 as an example, assuming that carrier A schedules carrier B across carriers, the sub-carrier interval of carrier A is 15 KHz, and the sub-carrier interval of carrier B is 30 KHz. Assume that both carrier A and carrier B schedule PDSCHs of which the PDSCH mapping types are TypeA, the PDCCH of carrier A is on first two symbols of the slot. According to the existing protocol, in a case where carrier A schedules the PDSCH on carrier A, the PDSCH can be in the same slot as the corresponding PDCCH, that is, the minimum $K_0$ value can be configured to be 0. At this time, a first slot satisfying the time requirement between the PDSCH and the PDCCH on carrier A is slot 0.

In the case where carrier A schedules a PDSCH on carrier B across carriers, according to the existing protocol, the second communication node needs to reserve a PDCCH processing delay with the length of four PDCCH symbol at first, and then the second communication node can only start schedules the PDSCH at the next slot satisfying the PDCCH processing delay. On carrier B, the PDSCH in FIG. 3 can only be scheduled from slot 1 on carrier B at the earliest, that is, the minimum $K_0$ value can only be configured to be 1. At this time, a first slot satisfying the time requirement between the PDSCH and the PDCCH on carrier B is slot 1.

If $K_0$ is configured to be 0 ($K_0$=0) to indicate the first slots on various carrier that satisfies the time requirement between the PDSCH and the PDCCH, for carrier A, $K_0$=0 indicates slot 0 and $K_0$=1 indicates slot 1; for carrier B, $K_0$=0 indicates slot 1, $K_0$=1 indicates slot 2, and so on. At this time, the second communication node schedules the PDSCHs on slot 0 of carrier and slot 1 of carrier B, and the second communication node only indicates one $K_0$ value in the DCI, that is, K0 is configures to be 0.

In an implementation, a base station configures two carriers, i.e. carrier 1 and carrier 2, for a user terminal. Carrier 1 is a long term evolution (LTE) carrier or a new radio (NR) carrier, and carrier 2 is an NR carrier. In order to make full use of the advantages of multiple input multiple output (MIMO) technology in an NR system, the user terminal needs to support sending uplink signals using two antenna ports in carrier 2. In a case where two antenna ports are used for sending uplink signals on carrier 2, the user terminal is configured with two sets of radio frequency links and one set of radio frequency links of carrier 1. If the user terminal sends the uplink signals on carrier 1 and carrier 2 at the same time, the user terminal is configured with three sets of radio frequency links. Configuring three sets of radio frequency links leads to high cost of a terminal. In view of this, the user terminal sending the uplink signals is limited in the embodiments of the present application, the user terminal can only configure two sets of radio frequency links by limiting the uplink signal sent by the user terminal, and can also fully utilize the advantages of the MIMO technology of the NR system.

In an embodiment, the base station configures two carriers, i.e. carrier 1 and carrier 2, for the user terminal. The user terminal has two transmission modes which are transmission mode one and transmission mode two.

The transmission mode one includes that the terminal is allowed to send an uplink signal on carrier 1.

The transmission mode two includes that the terminal is not allowed to send an uplink signal on carrier 2.

In an embodiment, the base station configures two carriers, i.e. carrier 1 and carrier 2, for the user terminal. The user terminal has two transmission modes which are transmission mode one and transmission mode two.

The transmission mode one includes that the user terminal uses one antenna port on carrier 1 to send an uplink signal, and the user terminal does not send an uplink signal on carrier 2; the user terminal uses one antenna port on carrier 1 to send the uplink signal, and the user terminal uses one antenna port on carrier 2 to send the uplink signal; and the user terminal does not send an uplink signal on carrier 1, and the user terminal uses one antenna port to send an uplink signal on carrier 2.

The transmission mode two includes that the user terminal does not send an uplink signal on carrier 1, and the user terminal uses two antenna ports on carrier 2 to send uplink signals; and the user terminal does not send an uplink signal on carrier 1, and the user terminal uses one antenna port to send an uplink signal on carrier 2.

In an embodiment, the uplink signal includes a physical uplink shared channel (PUSCH), a physical uplink control channel (PUCCH), a sounding reference signal (SRS) and a physical random access channel (PRACH).

In an embodiment, carrier 1 is one LTE carrier, and carrier 2 is one NR carrier.

In an embodiment, carrier 1 is one NR carrier, and carrier 2 is another NR carrier.

In an embodiment, in a case where carrier 1 is one NR carrier and carrier 2 is another NR carrier, the base station configures carrier 1 and carrier 2 in a same PUCCH group, which is helpful to reuse uplink signal multiplexing and discarding rules in the existing NR system and reduces the complexity of implementation.

In an embodiment, in a case where the user terminal is in the transmission mode one, the user terminal configures one set of radio frequency links to carrier 1 and another set of radio frequency links to carrier 2. In a case where the user terminal is in the transmission mode two, the user terminal configures two set of radio frequency links to carrier 2.

In an embodiment, the base station configures two carriers, i.e. carrier 1 and carrier 2, for the user terminal.

The user terminal judges whether the transmission mode needs to be switched according to a switchover triggering factor, the handover triggering factor includes at least one of: a DCI format, an SRS index corresponding to the uplink signal, the number of SRS ports corresponding to the uplink signal, the number of ports for transmitting the PUSCH, transmission of PRACH or a frame structure.

In an embodiment, the base station configures two carriers, i.e. carrier 1 and carrier 2, for the user terminal.

In a case where the user terminal is currently in transmission mode one, and the user terminal receives a notification from the base station to inform the terminal to use two antenna ports to send uplink signals on carrier 2 and in a next uplink period, the user terminal switches to the transmission mode two and sends the uplink signals on carrier 2 by using two antenna ports.

In a case where the user terminal is currently in transmission mode two, and the terminal receives a notification from the base station to inform the terminal to send an uplink signal on carrier 1 and in a next uplink period, the user terminal switches to the transmission mode one and sends the uplink signal on carrier 1.

In an embodiment, if a switching condition of the transmission mode is not satisfied, the user terminal remains in the current transmission mode.

In an embodiment, the base station configures two carriers, i.e. carrier 1 and carrier 2, for the user terminal.

In a case where the user terminal receives the notification from the base station to inform the user terminal to enter the transmission mode two in the next uplink period, the user terminal does not expect the base station to schedule the uplink signal on carrier 1 and in the next uplink period.

In a case where the user terminal receives the notification from the base station to inform the user terminal to enter the transmission mode one in the next uplink period, the user terminal does not expect the base station to schedule the uplink signals sent by two antenna ports on carrier 2 and in the next uplink period.

In an embodiment, the base station configures two carriers, i.e. carrier 1 and carrier 2, for the user terminal.

In a case where the user terminal receives the notification from the base station to inform the user terminal to send the uplink signals using two antenna ports on carrier 2 and in the next uplink period, the user terminal does not expect the base station to schedule the uplink signals on carrier 1 and in the next uplink period.

In a case where the user terminal receives the notification from the base station to inform the user terminal to send the uplink signal on carrier 1 and in the next uplink period, the user terminal does not expect the base station to schedule the uplink signals sent by two antenna ports on carrier 2 and in the next uplink period.

In an embodiment, assuming that the base station configures two carriers, i.e. carrier 1 and carrier 2, for the user terminal, in a case where the user terminal is currently in transmission mode one, and the terminal receives the notification from the base station to inform the user terminal to send the uplink signal using one antenna port on carrier 1 and in the next uplink period, the user terminal remains in the transmission mode one and sends the corresponding uplink signal on carrier 1.

In an embodiment, assuming that the base station configures two carriers, i.e. carrier 1 and carrier 2, for the user terminal, in a case where the user terminal is currently in transmission mode one, and the user terminal receives the notification from the base station to inform the user terminal to send the uplink signal using one antenna port on carrier 2 and in the next uplink period, the user terminal remains in the transmission mode one and sends the corresponding uplink signal on carrier 2.

In an embodiment, assuming that the base station configures two carriers, i.e. carrier 1 and carrier 2, for the user terminal, in a case where the user terminal is currently in transmission mode one, and the user terminal receives the notification from the base station to inform the user terminal to send the uplink signal using one antenna port on carrier 1 and carrier 2 and in the next uplink period, the user terminal remains in the transmission mode one and sends the corresponding uplink signal on carrier 1 and carrier 2.

In an embodiment, assuming that the base station configures two carriers, i.e. carrier 1 and carrier 2, for the user terminal, in a case where the user terminal is currently in transmission mode one, and the terminal receives the notification from the base station to inform the terminal to send the uplink signals using two antenna ports on carrier 2 and in the next uplink period, the user terminal switches to the transmission mode two and sends the corresponding uplink signals on carrier 2.

In an embodiment, assuming that the base station configures two carriers, i.e. carrier 1 and carrier 2, for the user terminal, in a case where the user terminal is currently in transmission mode two, and the terminal receives the notification from the base station to inform the user terminal to send the uplink signals using two antenna ports on carrier 2 and in the next uplink period, the user terminal remains in the transmission mode two and sends the corresponding uplink signals on carrier 2.

In an embodiment, assuming that the base station configures two carriers, i.e. carrier 1 and carrier 2, for the user terminal, in a case where the user terminal is currently in transmission mode two, and the terminal receives the notification from the base station to inform the user terminal to send the uplink signal using one antenna port on carrier 2 and in the next uplink period, the user terminal remains in the transmission mode two and sends the corresponding uplink signal on carrier 2.

In an embodiment, assuming that the base station configures two carriers, i.e. carrier 1 and carrier 2, for the user terminal, in a case where the user terminal is currently in transmission mode two, and the terminal receives the notification from the base station to inform the user terminal to send the uplink signal using one antenna port on carrier 1 and in the next uplink period, the user terminal switches to the transmission mode one and sends the corresponding uplink signal on carrier 1.

In an embodiment, the next uplink period represents a next slot, a next sub-frame or a next segment of continuous uplink symbols. In a case where the system configures a time division duplex (TDD) frame structure of "DDDSUDD-SUU" for one carrier with 15 KHz and configuration of "S" slot is "10:2:2", "D" represents a downlink slot, "U" represents an uplink slot, "S" represents a special slot, "10:2:2" represents that first 10 symbols of the special slot are downlink symbols, the last 2 symbols of the special slot are uplink symbols, and remaining middle 2 symbols of the special slot are flexible symbols (used as a guard interval for switching between uplink and downlink). In the frame structure of "DDDSUDDSUU", the first segment of continuous uplink symbols is 16 uplink symbols included in the first "S" slot and a subsequent "U" slot. The second segment of continuous uplink symbols is 30 uplink symbols included in the second "S" slot and subsequent two "U" slots.

In an embodiment, in a case where the DCI indicates that a transmission precoding matrix indicator (TPMI) corresponding to the PUSCH is 0, the PUSCH scheduled by the DCI is transmitted using only one antenna port.

In a case where the user terminal is currently in transmission mode one, and the user terminal receives the DCI from the base station, and the DCI indicates the user terminal to send the PUSCH with a TPMI of 0 on carrier 2 and in the next uplink period, the user terminal does not need to switch to the transmission mode two (that is, the user terminal remains in the transmission mode one) and sends the PUSCH on carrier 2.

In a case where the user terminal is currently in transmission mode one, and the user terminal receives the DCI from the base station, and the DCI indicates the user terminal to send the PUSCH with a TPMI of which the TPMI is not 0 on carrier 2 and in the next uplink period, the user terminal switches to the transmission mode two and sends the PUSCH on carrier 2.

In a case where the user terminal is currently in transmission mode one, and the user terminal receives the DCI from the base station, and the DCI indicates the user terminal to send the PUSCH with a TPMI of 0 on carrier 2 and in the next uplink period, the user terminal remains in the transmission mode two.

In an embodiment, in a case where the DCI indicates that a TPMI corresponding to the PUSCH is 1, the PUSCH scheduled by the DCI is transmitted using only one antenna port.

In a case where the user terminal is currently in transmission mode one, and the user terminal receives the DCI from the base station, and the DCI indicates the terminal to send the PUSCH with a TPMI of 1 on carrier 2 and in the next uplink period, the user terminal does not need to switch to the transmission mode two (that is, the user terminal does not need to switch to in the transmission mode two (that is, the terminal remains in the transmission mode one) and sends the PUSCH on carrier 2.

In a case where the user terminal is currently in transmission mode one, and the user terminal receives the DCI from the base station, and the DCI indicates the user terminal to send the PUSCH with a TPMI of which the TPMI is not 1 on carrier 2 and in the next uplink period, the user terminal switches to the transmission mode two and sends the PUSCH on carrier 2.

In a case where the user terminal is currently in transmission mode two, and the user terminal receives the DCI from the base station, and the DCI indicates the user terminal to send the PUSCH with a TPMI of 1 on carrier 2 and in the next uplink period, the user terminal remains in the transmission mode two.

In an embodiment, in a case where the user terminal is currently in transmission mode one, and the user terminal receives a DCI format A from the base station, and the DCI format A indicates the terminal to send an uplink signal on carrier 2 and in the next uplink period, the user terminal does not need to switch to the transmission mode two (that is, the user terminal remains in the transmission mode one) and sends the uplink signal on carrier 2.

In a case where the user terminal is currently in transmission mode one, and the user terminal receives a DCI format B from the base station, and the DCI format B indicates the terminal to send an uplink signal on carrier 2 and in the next uplink period, the user terminal switches to the transmission mode two and sends the uplink signal on carrier 2.

In a case where the user terminal is currently in transmission mode two, and the user terminal receives a DCI format A from the base station, and the DCI format A indicates the terminal to send an uplink signal on carrier 2 and in the next uplink period, the user terminal remains in the transmission mode two and sends the uplink signal on carrier 2.

In an embodiment, the DCI format A is a DCI format 0_0, and the DCI format B is a DCI format other than the DCI format 0_0 that the DCI format can schedule, trigger or activate an uplink signal.

In an embodiment, in a case where carrier 1 is one LTE carrier, and carrier 2 is one NR carrier, the base station configures one reference frame structure for the user terminal. The reference frame structure includes an uplink U slot and other slots, and the other slots include a downlink D slot and a special S slot.

In a case where the user terminal is in the uplink U slot, the user terminal is in the transmission mode one; in the case where the user terminal is in other slots, the user terminal is in the transmission mode 2.

In an embodiment, in a case where the user terminal enters the other slots from the uplink U slot, the user terminal switches from the transmission mode one to the transmission mode two. In a case where the user terminal enters the uplink U slot from the other slots, the user terminal switches from the transmission mode two to the transmission mode one.

In an embodiment, the reference frame structure configured by a system includes continuous P (P is a positive integer) uplink U slots. The user terminal does not send any uplink signal during a period before the start of the continuous P uplink U slots and a period after the end of the continuous P uplink U slots.

Figure 4:
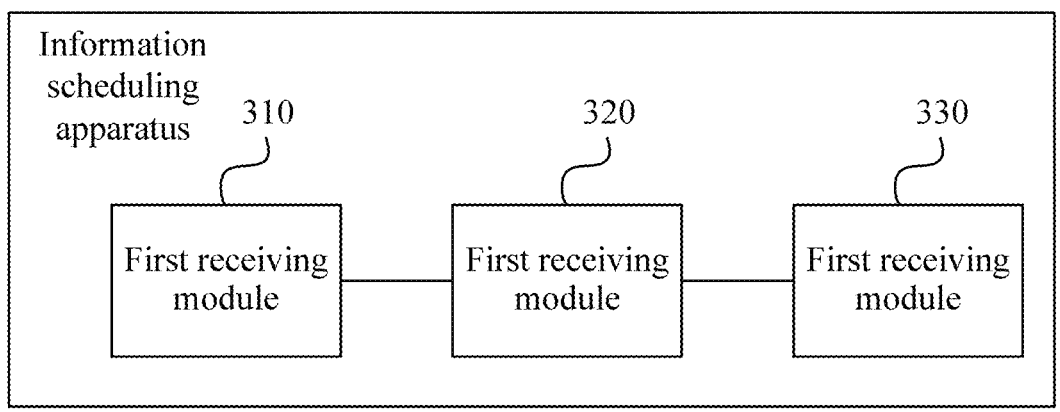
FIG. 4 is a block diagram illustrating the structure of an information scheduling apparatus according to an embodiment of the present application.

FIG. 4 is a block diagram illustrating the structure of an information scheduling apparatus according to an embodiment of the present application. As shown in FIG. 4, the information scheduling apparatus in this embodiment includes a first receiving module 310, a second receiving module 320 and a first determination module 330.

The first receiving module 310 is configured to receive PDSCH configuration information from a second communication node.

The second receiving module 320 is configured to receive DCI from the second communication node.

The first determination module 330 is configured to determine scheduling information of a PDSCH on at least one carrier according to the PDSCH configuration information and the DCI.

The information scheduling apparatus provided in the embodiment is configured to implement the information scheduling method applied to a first communication node in the embodiment shown in FIG. 1, and has the similar implementation principles and technical effects, which are not repeated herein.

In an embodiment, the scheduling information includes at least one of: a number of carriers currently scheduled, time domain resource indication information, a carrier scheduling PDSCH currently, or a CIF index scheduling PDSCH currently.

In an embodiment, the PDSCH configuration information includes a total number M of carriers schedulable to the DCI, and a RNTI used for indicating the DCI to currently schedule a PDCSH on one or N carriers, where N is a positive integer greater than 1 and less than or equal to M.

In an embodiment, the PDSCH configuration information includes: a mapping relationship between a CIF index and a carrier, and each CIF index is mapped to at least one carrier.

In an embodiment, the CIF in the DCI indicates the CIF index, a carrier mapped by the CIF index is a carrier on which the DCI currently schedules the PDCSH; in a case where the CIF index indicated by the CIF is mapped to N carriers, the DCI is used for scheduling PDSCHs on the N carriers, and one of the PDSCHs is scheduled on each of the N carriers, where N is a positive integer greater than 1; and in a case where the CIF index indicated by the CIF is mapped to one carrier, the DCI is used for scheduling a PDSCH on the one carrier.

In an embodiment, the PDSCH configuration information includes a mapping relationship between a TDRA index and at least one group of time domain resource indication information, and each of the at least one group of time domain resource indication information includes a slot offset $K_0$, a SLIV and a PDSCH mapping type.

In an embodiment, each group of time domain resource indication information includes the same $K_0$.

In an embodiment, each group of time domain resource indication information includes the same SLIV.

In an embodiment, the PDSCH configuration information further includes a mapping relationship between the each of the at least one group of time domain resource indication information and a carrier.

In an embodiment, a TDRA field in the DCI indicates the TDRA index, in a case where the TDRA index is mapped to N groups of time domain resource indication information, the DCI is used for scheduling PDSCHs on carriers corresponding to the N groups of time domain resource indication information, and one of the PDSCHs is scheduled on each of the carriers, where N is a positive integer greater than 1; and in a case where the TDRA index is mapped to one group of time domain resource indication information, the DCI is used for scheduling a PDSCH on a carrier corresponding to the one group of time domain resource indication information.

In an embodiment, a TDRA field of the DCI and a CIF field in the DCI jointly indicate the TDRA index.

In an embodiment, a CIF in the DCI indicates a CIF index, the CIF index is mapped to at least one carrier, and a TDRA field of the DCI indicates the TDRA index; in a case where the CIF index indicated by the CIF in the DCI is mapped to N carriers, and the TDRA index indicated by the TDRA field of the DCI is mapped to N groups of time domain resource indication information, the DCI is used for scheduling PDSCHs on the N carriers, and one of the PDSCHs is scheduled on each of the N carriers, where N is a positive integer greater than 1; and in a case where the CIF index indicated by the CIF in the DCI is mapped to one carrier, and the TDRA index indicated by the TDRA field of the DCI is mapped to one group of time domain resource indication information, the DCI is used for scheduling a PDSCH on the one carriers.

In an embodiment, a number of groups of time domain resource indication information mapped by the TDRA index indicated by the TDRA field in the DCI is same as a number of carriers mapped by the CIF index indicated by the CIF in the DCI.

In an embodiment, a CIF in the DCI is used for indicating a CIF index, and the CIF index is mapped to a carrier of which one CIF index is i; and in a case where a TDRA index indicated by a TDRA field in the DCI is mapped to N groups of time domain resource indication information, the DCI is used for scheduling PDSCHs on N carriers of which CIF indexes are respectively imodM, (i+1)modM, . . . , (i+N−1)modM, and one of the PDSCHs is scheduled on each of the N carriers, where M is a total number of carriers schedulable to the DCI, N is a positive integer greater than 1, and mod is a remainder operation.

In an embodiment, the DCI indicates two CIFs, each of the two CIFs indicates one CIF index, and each CIF index is mapped to one carrier.

In an embodiment, the PDSCH configuration information includes: a mapping relationship between a CIF index and two groups of carriers, where a first group of carriers includes one carrier, and a second group of carriers includes at least one carrier.

In an embodiment, in a case where the CIF index corresponds to the first group of carriers, the DCI is used for scheduling a PDSCH on the one carrier mapped by the CIF index in the first group of carriers; and in a case where the CIF index corresponds to the second group of carriers, the DCI is used for scheduling a PDSCH on the at least one carrier mapped by the CIF index in the second group of carriers, and one PDSCH is scheduled on each of the at least one carrier.

In an embodiment, the PDSCH configuration information includes time domain resource indication information.

In a case where $K_0$ in the time domain resource indication information is equal to 0, the $K_0$ is used for indicating a first slot satisfying a preset time between a scheduling moment of a PDSCH on each carrier and a PDCCH corresponding to the scheduling moment.

FIG. 5 is a block diagram illustrating the structure of another information scheduling apparatus according to an embodiment of the present application. As shown in FIG. 5, the information indication apparatus in this embodiment includes a first sending module 410, a second determination module 420 and a second sending module 430.

The first sending module 410 is configured to send predetermined PDSCH configuration information to a first communication node.

The second determination module 420 is configured to determine DCI used for scheduling a PDSCH on at least one carrier according to the PDSCH configuration information.

The second sending module 430 is configured to send the DCI to the first communication node.

The information scheduling apparatus provided in the embodiment is configured to implement the information scheduling method applied to a second communication node in the embodiment shown in FIG. 2, and has the similar implementation principles and technical effects, which are not repeated herein.

In an embodiment, the PDSCH configuration information includes a total number M of carriers schedulable to the DCI, and a RNTI used for indicating the DCI to currently schedule a PDCSH on one or N carriers, where N is a positive integer greater than 1 and less than or equal to M.

In an embodiment, the PDSCH configuration information includes: a mapping relationship between a CIF index and a carrier, and each CIF index is mapped to at least one carrier.

In an embodiment, the CIF in the DCI indicates the CIF index, a carrier mapped by the CIF index is a carrier on which the DCI currently schedules the PDCSH; in a case where the CIF index indicated by the CIF is mapped to N carriers, the DCI is used for scheduling PDSCHs on the N carriers, and one of the PDSCHs is scheduled on each of the N carriers, where N is a positive integer greater than 1; and in a case where the CIF index indicated by the CIF is mapped to one carrier, the DCI is used for scheduling a PDSCH on the one carrier.

In an embodiment, the PDSCH configuration information includes a mapping relationship between a TDRA index and at least one group of time domain resource indication information, and each of the at least one group of time domain resource indication information includes a slot offset $K_0$, a SLIV and a PDSCH mapping type.

In an embodiment, each group of time domain resource indication information includes the same $K_0$.

In an embodiment, each group of time domain resource indication information includes the same SLIV.

In an embodiment, the PDSCH configuration information further includes a mapping relationship between the each of the at least one group of time domain resource indication information and a carrier.

In an embodiment, a TDRA field in the DCI indicates the TDRA index, in a case where the TDRA index is mapped to N groups of time domain resource indication information, the DCI is used for scheduling PDSCHs on carriers corresponding to the N groups of time domain resource indication information, and one of the PDSCHs is scheduled on each of the carriers, where N is a positive integer greater than 1; and in a case where the TDRA index is mapped to one group of time domain resource indication information, the DCI is used for scheduling a PDSCH on a carrier corresponding to the one group of time domain resource indication information.

In an embodiment, a TDRA field of the DCI and a CIF field in the DCI jointly indicate the TDRA index.

In an embodiment, a CIF in the DCI indicates a CIF index, the CIF index is mapped to at least one carrier, and a TDRA field of the DCI indicates the TDRA index; in a case where the CIF index indicated by the CIF in the DCI is mapped to N carriers, and the TDRA index indicated by the TDRA field of the DCI is mapped to N groups of time domain resource indication information, the DCI is used for scheduling PDSCHs on the N carriers, and one of the PDSCHs is scheduled on each of the N carriers, where N is a positive integer greater than 1; and in a case where the CIF index indicated by the CIF in the DCI is mapped to one carrier, and the TDRA index indicated by the TDRA field of the DCI is mapped to one group of time domain resource indication information, the DCI is used for scheduling a PDSCH on the one carriers.

In an embodiment, a number of groups of time domain resource indication information mapped by the TDRA index indicated by the TDRA field in the DCI is same as a number of carriers mapped by the CIF index indicated by the CIF in the DCI.

In an embodiment, a CIF in the DCI is used for indicating a CIF index, and the CIF index is mapped to a carrier of which one CIF index is i; and in a case where a TDRA index indicated by a TDRA field in the DCI is mapped to N groups of time domain resource indication information, the DCI is used for scheduling PDSCHs on N carriers of which CIF indexes are respectively imodM, (i+1)modM, . . . , (i+N−1)modM, and one of the PDSCHs is scheduled on each of the N carriers, where M is a total number of carriers schedulable to the DCI, N is a positive integer greater than 1, and mod is a remainder operation.

In an embodiment, the DCI indicates two CIFs, each of the two CIFs indicates one CIF index, and each CIF index is mapped to one carrier.

In an embodiment, the PDSCH configuration information includes: a mapping relationship between a CIF index and two groups of carriers, where a first group of carriers includes one carrier, and a second group of carriers includes at least one carrier.

In an embodiment, in a case where the CIF index corresponds to the first group of carriers, the DCI is used for scheduling a PDSCH on the one carrier mapped by the CIF index in the first group of carriers; and in a case where the CIF index corresponds to the second group of carriers, the DCI is used for scheduling a PDSCH on the at least one carrier mapped by the CIF index in the second group of carriers, and one PDSCH is scheduled on each of the at least one carrier.

In an embodiment, the PDSCH configuration information includes time domain resource indication information, and in a case where $K_0$ in the time domain resource indication information is equal to 0, the $K_0$ is used for indicating a first slot satisfying a preset time between a scheduling moment of a PDSCH on each carrier and a PDCCH corresponding to the scheduling moment.

Figure 6:
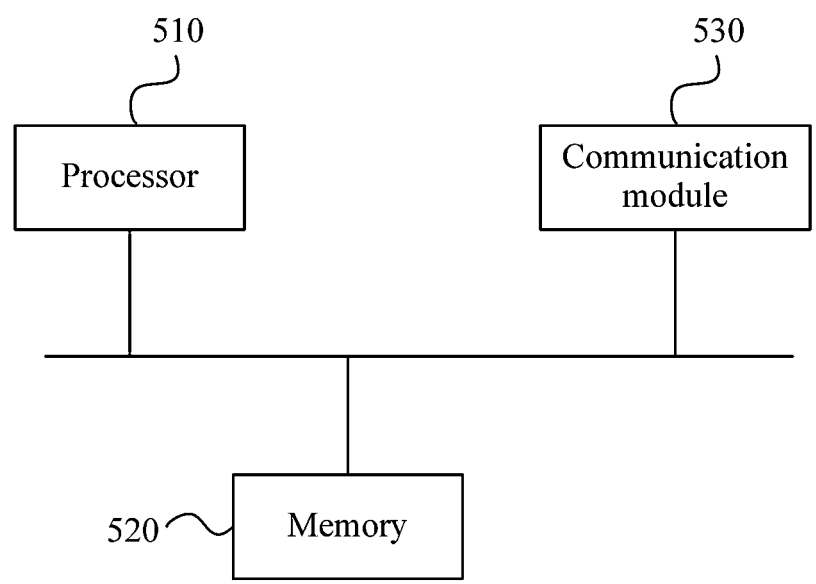
FIG. 6 is a diagram illustrating the structure of a device according to an embodiment of the present application.

FIG. 6 is a diagram illustrating the structure of a device according to an embodiment of the present application. As shown in FIG. 6, the device provided in the present application includes a processor 510 and a memory 520. The number of processors 510 in the device may be one or more, with one processor 510 as an example in FIG. 6. The number of memories 520 in the device may be one or more, with one memory 520 as an example in FIG. 6. The processor 510 and memory 520 of the device are connected by a bus or in other manners. The connection by a bus is taken as an example in FIG. 6. In this embodiment, the device is a first communication node.

As a computer-readable storage medium, the memory 520 may be configured to store software programs, computer-executable programs and modules, such as program instructions/modules (for example, the first receiving module, the second receiving module and the first determination module in the information scheduling apparatus) corresponding to the device according to any embodiment of the present application. The memory 520 may include a program storage region and a data storage region, where the program storage region may store an operating system and an application program required by at least one function while the data storage region may store data created depending on use of a device. Additionally, the memory 520 may include a high-speed random-access memory and may further include a non-volatile memory, for example, at least one magnetic disk memory and flash memory or other non-volatile solid-state memories. In some examples, the memory 520 may further include memories located remotely relative to the processor 510, and these remote memories may be connected to the device via a network. Examples of the preceding network include, but are not limited to, the Internet, an intranet, a local area network, a mobile communication network, and a combination thereof.

The preceding device may be configured to perform the information scheduling method applied to the first communication node and provided in any preceding embodiment and has corresponding functions and effects.

In a case where the device is a second communication node, the device provided above may be configured to execute the information scheduling method applied to the second communication node that is provided by any preceding embodiment, and has corresponding functions and effects.

Embodiments of the present application further provide a storage medium including computer-executable instructions. When executed by a computer processor, the computer-executable instructions cause the processor to perform an information scheduling method. The information scheduling method is applied to a first communication node. The method includes receiving PDSCH configuration information from a second communication node, receiving DCI from the second communication node, and determining scheduling information of a PDSCH on at least one carrier according to the PDSCH configuration information and the DCI.

Embodiments of the present application further provide a storage medium including computer-executable instructions. When executed by a computer processor, the computer-executable instructions cause the processor to perform an information scheduling method. The information scheduling method is applied to a second communication node. The method includes sending predetermined PDSCH configuration information to a first communication node, determining DCI used for scheduling a PDSCH on at least one carrier according to the PDSCH configuration information, and sending the DCI to the first communication node.

It is to be understood by those skilled in the art that the term "user equipment" covers any suitable type of wireless user equipment, for example, a mobile phone, a portable data processing apparatus, a portable web browser or a vehicle-mounted mobile station.

In general, multiple embodiments of the present application may be implemented in hardware or special-purpose circuits, software, logic, or any combination thereof. For example, some aspects may be implemented in hardware while other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in the drawings of the present application may represent program processes, or may represent interconnected logic circuits, modules, and functions, or may represent a combination of program processes and logic circuits, modules, and functions. A computer program may be stored in a memory. The memory may be of any type suitable for the local technical environment and may be implemented using any suitable data storage technology, such as, but not limited to, a read-only memory (ROM), a random-access memory (RAM) and an optical memory device and system (a digital video disc (DVD) or a compact disc (CD)). Computer-readable media may include non-transitory storage media. The data processor may be of any type suitable to the local technical environment, such as, but not limited to, a general purpose computer, a special purpose computer, a microprocessor, a digital signal processor (DSP), an application specific integrated circuit (ASIC), a field-programmable gate array (FGPA), and a processor based on a multi-core processor architecture.

What is claimed is:

1. An information scheduling method, applied to a first communication node, comprising:
    receiving physical downlink shared channel (PDSCH) configuration information from a second communication node,
        wherein the PDSCH configuration information comprises a mapping relationship between a time domain resource assignment (TDRA) index and at least one group of time domain resource indication information,
        wherein each of the at least one group of time domain resource indication information comprises a slot offset $K_0$, a start length indicator value (SLIV) and a PDSCH mapping type, and
        wherein the PDSCH configuration information further comprises a mapping relationship between the each of the at least one group of time domain resource indication information and a carrier;
    receiving downlink control information (DCI) from the second communication node; and
    determining scheduling information of a PDSCH on a plurality of carriers according to the PDSCH configuration information and the DCI.

2. The method of claim 1, wherein the scheduling information comprises time domain resource indication information, one or more carriers scheduling PDSCH currently, and a carrier indication field (CIF) index of the one or more carriers scheduling PDSCH currently.

3. The method of claim 1, wherein the PDSCH configuration information comprises:
    a mapping relationship between a carrier indication field (CIF) index and one or more carriers, and each CIF index is mapped to at least one carrier.

4. The method of claim 3,
    wherein a CIF in the DCI indicates the CIF index, and a carrier mapped by the CIF index is a carrier on which the DCI currently schedules the PDSCH;
    in a case where the CIF index indicated by the CIF is mapped to N carriers, the DCI is used for scheduling PDSCHs on the N carriers, and one of the PDSCHs is scheduled on each of the N carriers, wherein N is a positive integer greater than 1; and
    in a case where the CIF index indicated by the CIF is mapped to one carrier, the DCI is used for scheduling a PDSCH on the one carrier.

5. An information scheduling method, applied to a second communication node, comprising:
    sending predetermined physical downlink shared channel (PDSCH) configuration information to a first communication node,
        wherein the PDSCH configuration information comprises a mapping relationship between a time domain resource assignment (TDRA) index and at least one group of time domain resource indication information,
        wherein each of the at least one group of time domain resource indication information comprises a slot offset $K_0$, a start length indicator value (SLIV) and a PDSCH mapping type, and
        wherein the PDSCH configuration information further comprises a mapping relationship between the each of the at least one group of time domain resource indication information and a carrier;

determining downlink control information (DCI) used for scheduling a PDSCH on a plurality of carriers according to the PDSCH configuration information; and sending the DCI to the first communication node.

6. The method of claim 5, wherein the PDSCH configuration information comprises:
a mapping relationship between a carrier indication field (CIF) index and one or more carriers, and each CIF index is mapped to at least one carrier.

7. The method of claim 6,
wherein a CIF in the DCI indicates the CIF index, and a carrier mapped by the CIF index is a carrier on which the DCI currently schedules the PDSCH;
in a case where the CIF index indicated by the CIF is mapped to N carriers, the DCI is used for scheduling PDSCHs on the N carriers, and one of the PDSCHs is scheduled on each of the N carriers, wherein N is a positive integer greater than 1; and
in a case where the CIF index indicated by the CIF is mapped to one carrier, the DCI is used for scheduling a PDSCH on the one carrier.

8. An apparatus comprising one or more processors configured to cause the apparatus to:
receive physical downlink shared channel (PDSCH) configuration information from a second communication node,
wherein the PDSCH configuration information comprises a mapping relationship between a time domain resource assignment (TDRA) index and at least one group of time domain resource indication information,
wherein each of the at least one group of time domain resource indication information comprises a slot offset $K_0$, a start length indicator value (SLIV) and a PDSCH mapping type, and
wherein the PDSCH configuration information further comprises a mapping relationship between the each of the at least one group of time domain resource indication information and a carrier;
receive down control information (DCI) from the second communication node; and
determine scheduling information of a PDSCH on a plurality of carriers according to the PDSCH configuration information and the DCI.

9. The apparatus of claim 8, wherein the scheduling information comprises time domain resource indication information, one or more carriers scheduling PDSCH currently, and a carrier indication field (CIF) index of the one or more carriers scheduling PDSCH currently.

10. The apparatus of claim 8, wherein the PDSCH configuration information comprises:
a mapping relationship between a carrier indication field (CIF) index and one or more carriers, and each CIF index is mapped to at least one carrier.

11. The apparatus of claim 10,
wherein a CIF in the DCI indicates the CIF index, and a carrier mapped by the CIF index is a carrier on which the DCI currently schedules the PDSCH;
in a case where the CIF index indicated by the CIF is mapped to N carriers, the DCI is used for scheduling PDSCHs on the N carriers, and one of the PDSCHs is scheduled on each of the N carriers, wherein N is a positive integer greater than 1; and
in a case where the CIF index indicated by the CIF is mapped to one carrier, the DCI is used for scheduling a PDSCH on the one carrier.

12. An apparatus comprising one or more processors configured to cause the apparatus to:
send predetermined physical downlink shared channel (PDSCH) configuration information to a first communication node,
wherein the PDSCH configuration information comprises a mapping relationship between a time domain resource assignment (TDRA) index and at least one group of time domain resource indication information,
wherein each of the at least one group of time domain resource indication information comprises a slot offset $K_0$, a start length indicator value (SLIV) and a PDSCH mapping type, and
wherein the PDSCH configuration information further comprises a mapping relationship between the each of the at least one group of time domain resource indication information and a carrier;
determine downlink control information (DCI) used for scheduling a PDSCH on a plurality of carriers according to the PDSCH configuration information; and
send the DCI to the first communication node.

13. The apparatus of claim 12, wherein the PDSCH configuration information comprises:
a mapping relationship between a carrier indication field (CIF) index and one or more carriers, and each CIF index is mapped to at least one carrier.

14. The apparatus of claim 13,
wherein a CIF in the DCI indicates the CIF index, and a carrier mapped by the CIF index is a carrier on which the DCI currently schedules the PDSCH;
in a case where the CIF index indicated by the CIF is mapped to N carriers, the DCI is used for scheduling PDSCHs on the N carriers, and one of the PDSCHs is scheduled on each of the N carriers, wherein N is a positive integer greater than 1; and
in a case where the CIF index indicated by the CIF is mapped to one carrier, the DCI is used for scheduling a PDSCH on the one carrier.

* * * * *